United States Patent
Chen et al.

(10) Patent No.: US 11,922,217 B2
(45) Date of Patent: Mar. 5, 2024

(54) SYSTEMS AND METHODS OF OPTIMIZING RESOURCE ALLOCATION USING MACHINE LEARNING AND PREDICTIVE CONTROL

(71) Applicant: Nasdaq, Inc., New York, NY (US)

(72) Inventors: Shihui Chen, Boston, MA (US); Keon Shik Kim, Cambridge, MA (US); Douglas Hamilton, Boston, MA (US)

(73) Assignee: Nasdaq, Inc., New York, NY (US)

( * ) Notice: Subject to any disclaimer, the term of this patent is extended or adjusted under 35 U.S.C. 154(b) by 693 days.

(21) Appl. No.: 17/097,178

(22) Filed: Nov. 13, 2020

(65) Prior Publication Data

US 2022/0156117 A1    May 19, 2022

(51) Int. Cl.
*G06F 9/50* (2006.01)
*G06N 20/00* (2019.01)

(52) U.S. Cl.
CPC .............. *G06F 9/5027* (2013.01); *G06F 9/50* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 11,609,788 B2 * | 3/2023 | Cella | G06F 16/24 |
| 2020/0104178 A1 | 4/2020 | Cella | |
| 2020/0250606 A1 | 8/2020 | Moorthy et al. | |
| 2020/0364279 A1 | 11/2020 | Pal et al. | |

OTHER PUBLICATIONS

International Search Report and Written Opinion of the International Searching Authority for PCT/US2021/055551 dated Jan. 21, 2022, 19 pages.

* cited by examiner

*Primary Examiner* — Qing Yuan Wu
(74) *Attorney, Agent, or Firm* — NIXON & VANDERHYE P.C.

(57) ABSTRACT

A computer system includes a transceiver that receives over a data communications network different types of input data from multiple source nodes and a processing system that defines for each of multiple data categories, a set of groups of data objects for the data category based on the different types of input data. Predictive machine learning model(s) predict a selection score for each group of data objects in the set of groups of data objects for the data category for a predetermined time period. Control machine learning model(s) determine how many data objects are permitted for each group of data objects based on the selection score. Decision-making machine learning model(s) prioritize the permitted data objects based on one or more predetermined priority criteria. Subsequent activities of the computer system are monitored to calculate performance metrics for each group of data objects and for data objects actually selected during the predetermined time period. Predictive machine learning model(s) and decision-making machine learning model(s) are adjusted based on the performance metrics to improve respective performance(s).

21 Claims, 16 Drawing Sheets

| | Group trading volume | % volume | # of strikes on waiting list | | Quota per group |
|---|---|---|---|---|---|
| G1: Strike Price ∈ [Spot Price * 90%, Spot Price * 110%] Time to maturoty ∈ [0,14] | 500 | 50% | 50 | | 50 |
| G2: Strike Price ∈ [Spot Price * 90%, Spot Price * 110%] Time to maturoty ∈ [15,28] | 250 | 25% | 50 | | 40 |
| ... | | | | | |
| Gn: Strike Price ∈ [Spot Price * 20%, Spot Price * 30%] Time to maturoty ∈ [91,150] | 10 | 1% | 20 | | 10 |
| Total | 1000 | 100% | | | |

- % of predicted trading volume >= 50% → list 100% of the strikes
- % of predicted trading volume ∈ [25%,50%) → list 80% of the strikes
- % of predicted trading volume < 25% → list 50% of the strikes

FIG. 13

SYSTEMS AND METHODS OF OPTIMIZING RESOURCE ALLOCATION USING MACHINE LEARNING AND PREDICTIVE CONTROL

TECHNICAL OVERVIEW

The technology described in this patent application relates to optimizing allocation of computer resources in computer systems using machine learning and predictive control. In one example application, the technology is used to efficiently process large numbers of data sets to generate a reduced number of data sets with a high probability of being selected for further processing thereby optimizing the allocation of resources to process high probability data sets.

INTRODUCTION

Many modern computer systems and platforms must process enormous amounts of data for each of many possible, diverse data categories and objects. But computer systems have limited data processing and data storage resources including limited data processing speed and capacity, memory storage, power, and throughput over data communication networks. Each data category may be associated with many data objects, and each data object may having many associated variables and/or parameters. Further, each variable and/or parameter may have a wide range of values. A specific set of values for the variables and/or parameters associated with the data objects for a data category is referred to as a data set.

Given large numbers of different possible data sets for the data objects for each of many data categories, computer systems are confronted with significant technical challenges. Massive amounts of data must be received from one or typically multiple data communication networks and parsed, and the parsed information then being stored in one or more data memories. The parsed information is retrieved from memory for processing using one or typically multiple data processors to analyze parsed information to generate outputs including thousands, millions, or even more different possible data sets for each category's data objects. Those outputs must then be communicated over one or more data communication networks by the computer system to end users. In this situation, the computer system resources (memory storage capacity, data processing capacity, communications bandwidth, etc.) are easily overwhelmed, and the performance of the computer system (e.g., processing speed, data communication speed, power consumption, and the like) suffers. So one technical challenge is optimizing allocation of computer resources in computer systems.

Even if all of the possible data sets could be processed and communicated for every category's data objects, which is sometimes not possible, not all of the possible data sets are necessarily worth the resource costs because oftentimes only a smaller subset of data sets is of significant interest to end users. Another technical challenge is how to reliably predict which smaller subset of the data sets will ultimately turn out to be of significant interest to end users. To date, there are no known data processing systems or techniques that efficiently and accurately identify such a subset of data sets that have a high probability of being of significant interest to end users so that computer system resources can be optimally allocated to that subset of data sets.

An additional problem is that many computer systems function in a rapidly changing environment where data categories, data objects, variable and parameter values, and data set interest all change. Thus, a further technical challenge is monitoring and identifying these sorts of changes and adapting the computer system to rapidly and accurately respond to those types of changes.

More generally, there is a technical challenge of how to optimize allocation of limited resources in complex data processing applications where the data processing environment changes and perhaps quite rapidly.

Accordingly, it will be appreciated that new and improved techniques, systems, and processes are continually sought after in these and other areas of technology to address these technical challenges.

SUMMARY

A computer system includes a transceiver that receives over a data communications network different types of input data from multiple source nodes and a processing system that defines for each of multiple data categories, a set of groups of data objects for the data category based on the different types of input data. Predictive machine learning model(s) predict a selection score for each group of data objects in the set of groups of data objects for the data category for a predetermined time period. Control machine learning model(s) determine how many data objects are permitted for each group of data objects based on the selection score. Decision-making machine learning model(s) prioritize the permitted data objects based on one or more predetermined priority criteria. Subsequent activities of the computer system are monitored to calculate performance metrics for each group of data objects and for data objects actually selected during the predetermined time period. Predictive machine learning model(s) and decision-making machine learning model(s) are adjusted based on the performance metrics to improve respective performance(s).

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 13 is a diagram illustrating an example determination of how many objects are permitted (a "quota") for each of multiple groups of data objects based on a selection score according to example embodiments;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Figure 16:
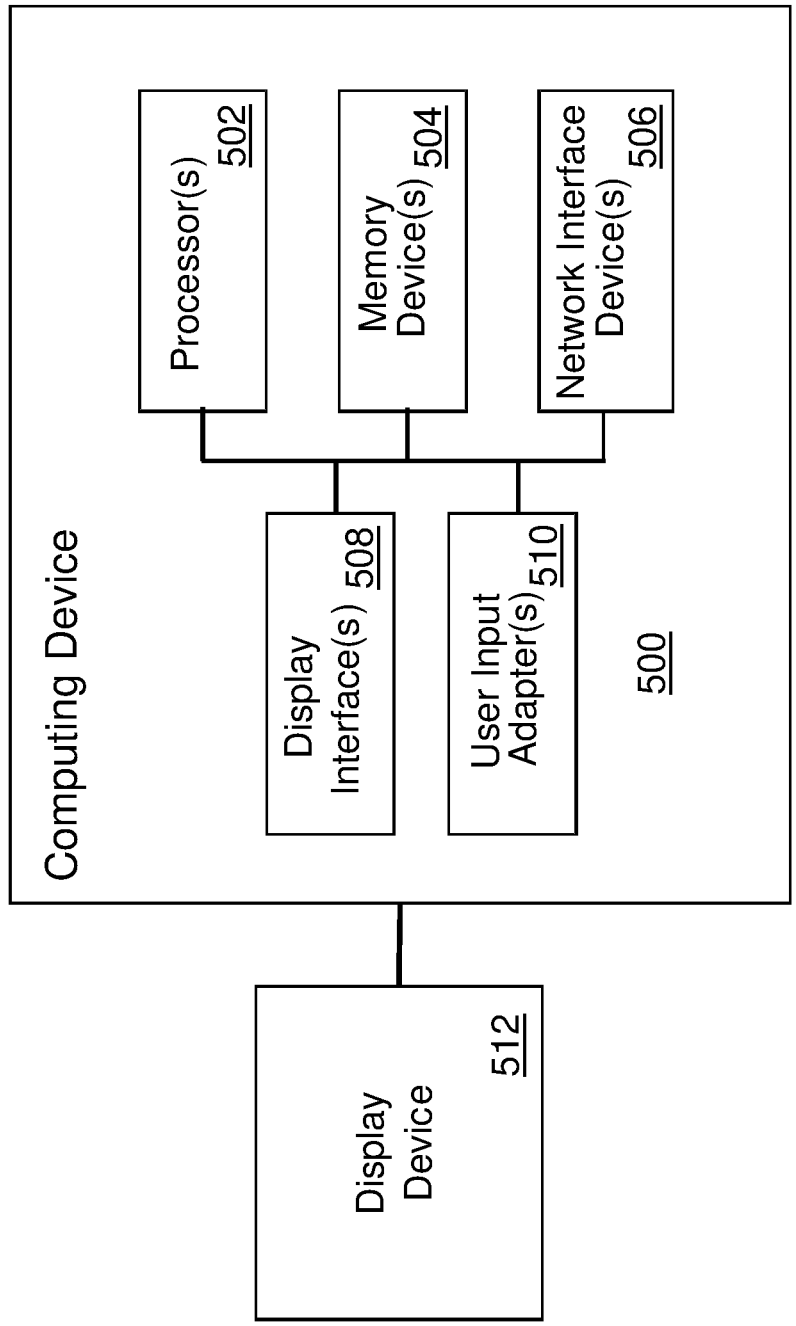
FIG. 16 shows an example computing system that may be used in some embodiments to implement features described herein.

Certain example embodiments relate to a computer system that includes a transceiver to receive over a data communications network different types of input data from multiple source nodes and a processing system including at least one hardware processor (e.g., the computing node 500 shown in FIG. 16). The computer system defines for each of multiple data categories, a set of groups of data objects for the data category based on the different types of input data. The computer system performs machine learning which involves creating models, training the models on sets of training data, and processing additional test data with the trained models to make predictions and decisions. The computer system uses one or more predictive machine learning model(s) to predict a selection score for each group of data objects in the set of groups of data objects for the data category for a predetermined time period. Control machine learning model(s) determine how many data objects are permitted for each group of data objects based on the selection score. Decision-making machine learning model(s) prioritize the permitted data objects based on one or more predetermined priority criteria. Subsequent activities of the computer system are monitored to calculate performance metrics for each group of data objects and for data objects actually selected during the predetermined time period. Predictive machine learning model(s) adjust the decision-making machine learning model(s) based on the monitored activities to improve respective performance(s).

The technological improvements offered by the technology described in this application can be applied in different domains, such as for example electronic trading platforms, retail shelf space management, data packet routing over networks, airline fleet scheduling, cargo space optimization for containers optimization, etc. Thus, the technology may be applied to any domain that requires resource allocation.

A detailed but non-limiting application is provided in the description to analyzing very large amounts of data for each of many possible, diverse data categories and objects (e.g., including thousands, millions, or even more different possible data sets for each category's data objects) and narrow those large amounts to identify a subset of those data objects that are worth the processing resources required to generate useful data, e.g., that have a high probability of being of significant interest to end users. Less data to be communicated, stored, and processed means less data needs to be communicated over data communication networks by the computer system to end users. It also means there is lower consumption of other computer system resources like memory storage capacity and data processing capacity. That results in another benefit—improved performance of the computer system including faster processing speed, faster data communication speed, lower power consumption, and the like.

Using the novel predictive, control, and decision making machine learning models provides another technical advantage of narrowing the large amounts of data intelligently, both in terms of efficiency and accuracy.

The monitoring and machine learning model retraining provides another technical advantage in that the computer system functions well in and adapts to a rapidly changing environment where data categories, data objects, variable and parameter values, and data set interest all change. The computer system monitors and identifies such changes and adapts the computer system, e.g., by training and retraining the predictive and decision making machine learning models based on feedback that detects those changes, to rapidly and accurately respond and adapt to the changes.

Figure 1:
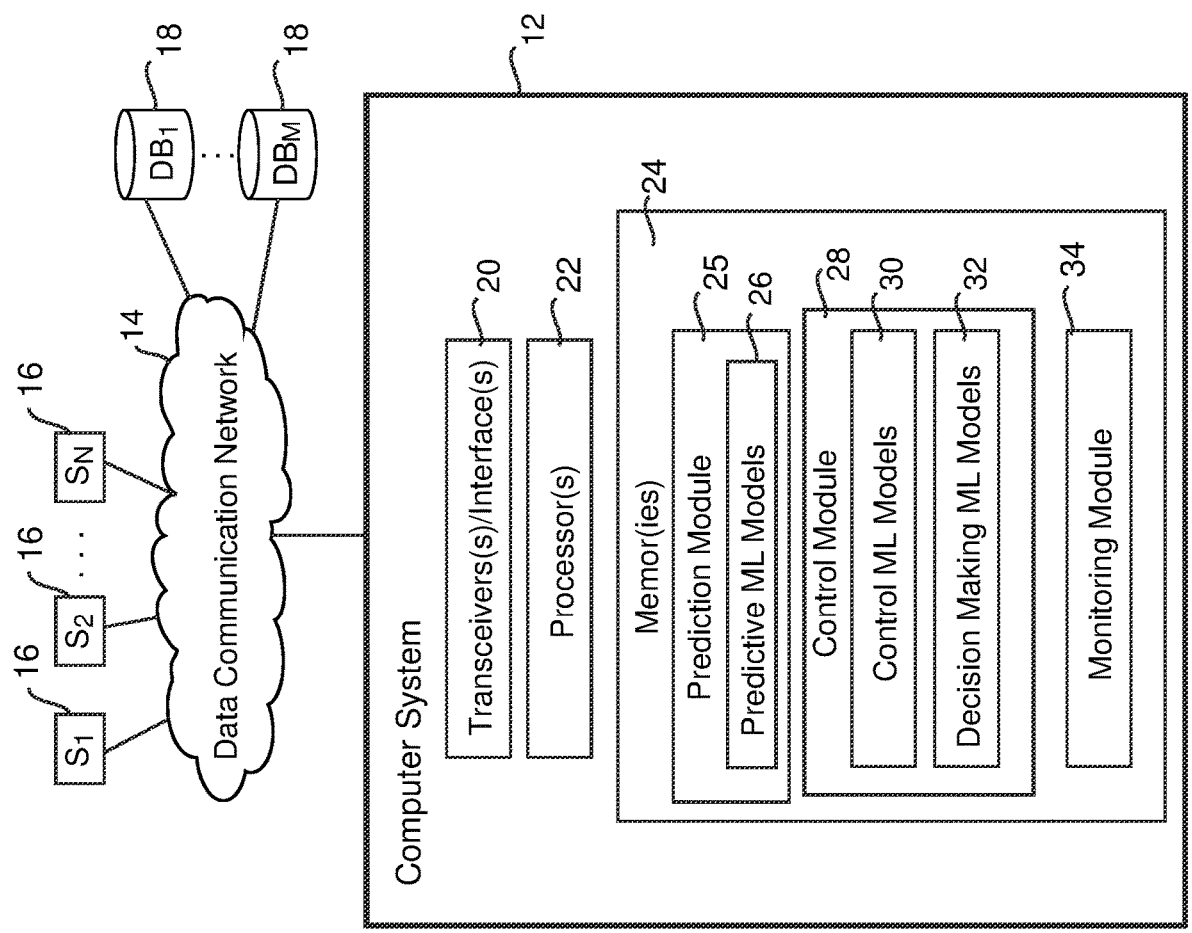
FIG. 1 is an example computer system diagram according to certain example embodiments.
Figure 2:
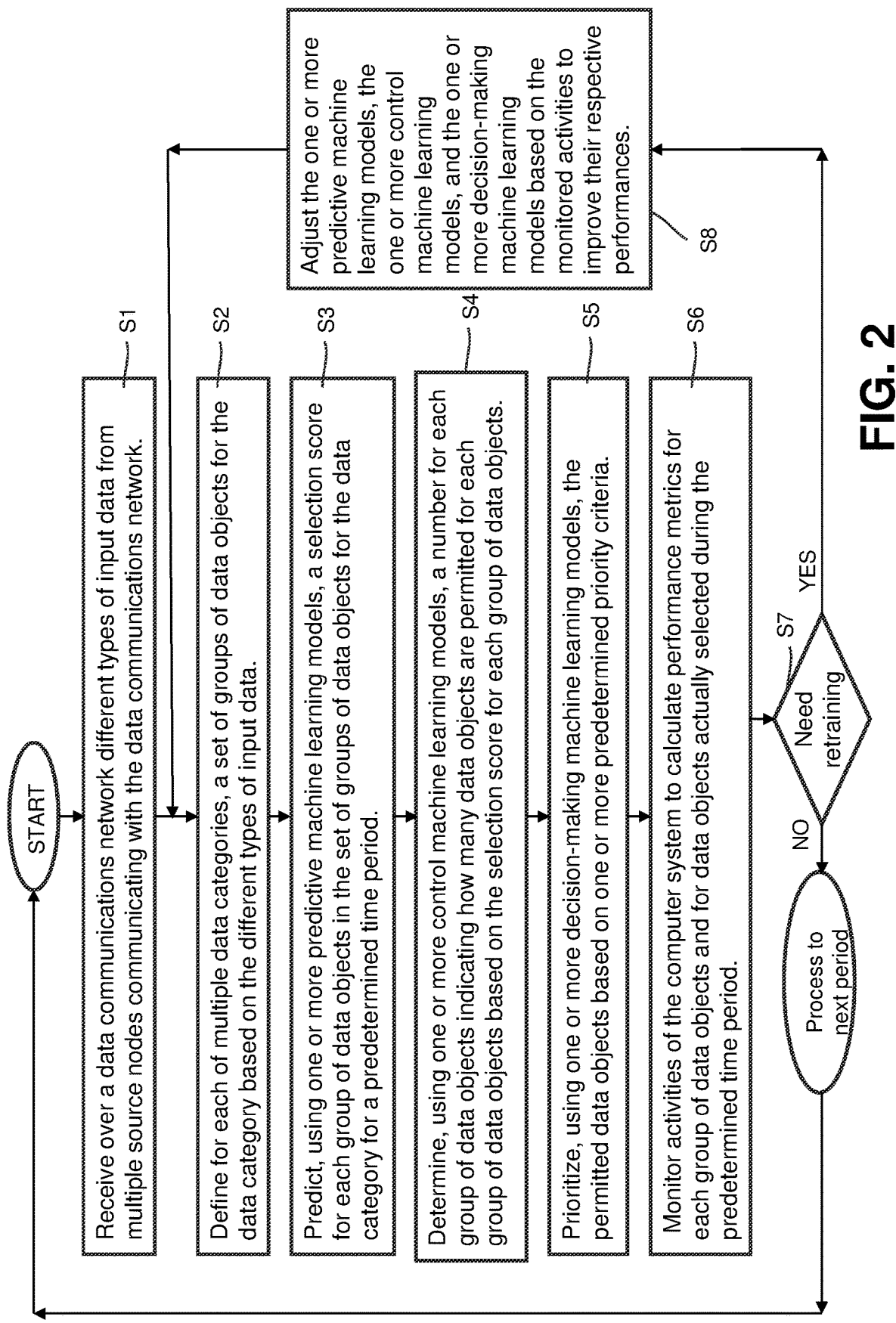
FIG. 2 is a flowchart showing example computer-implemented procedures according to certain example embodiments.
Figure 3:
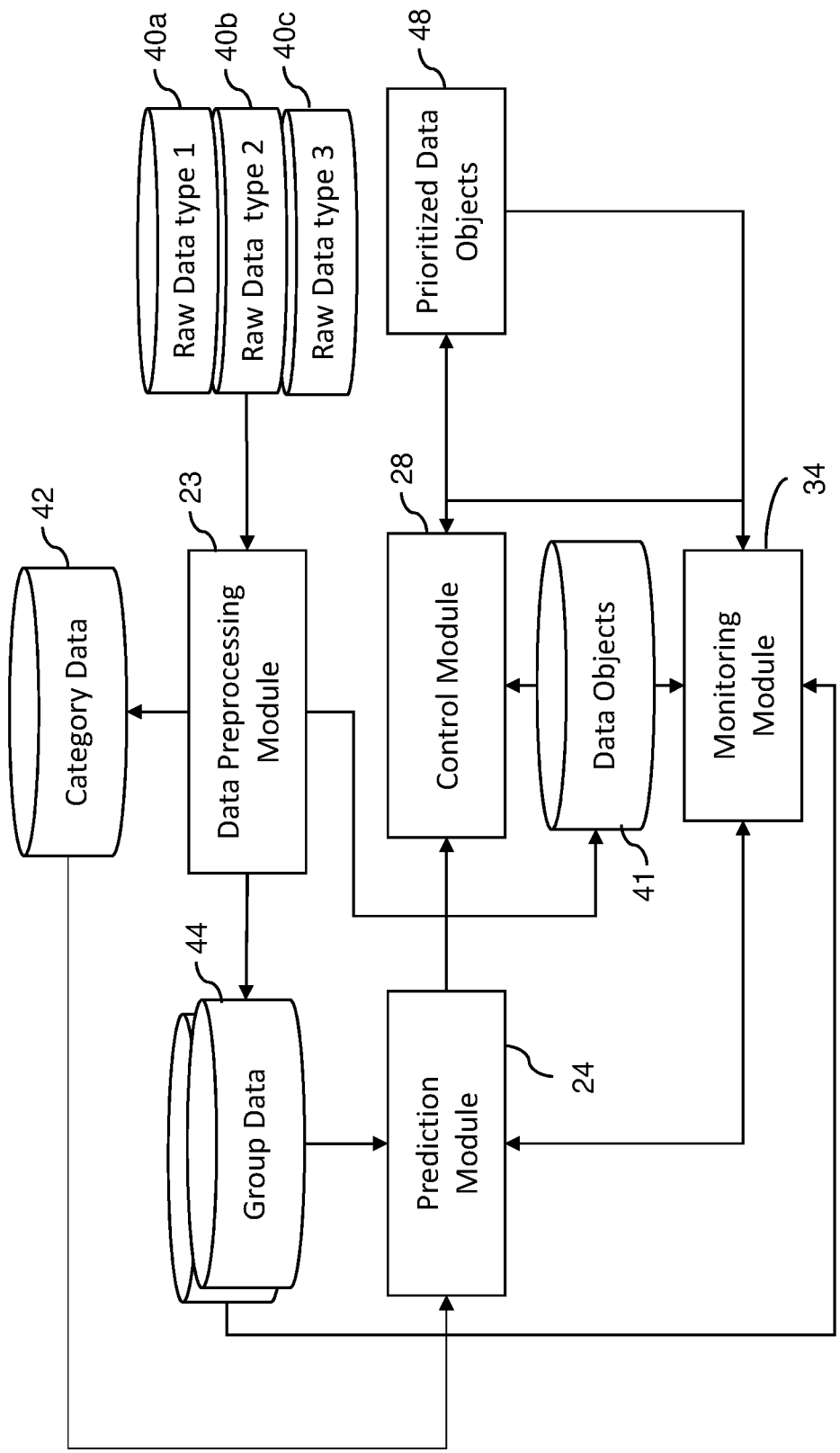
FIG. 3 illustrates a system diagram showing data communications between various computer and data storage entities according to certain example embodiments.
Figure 4:
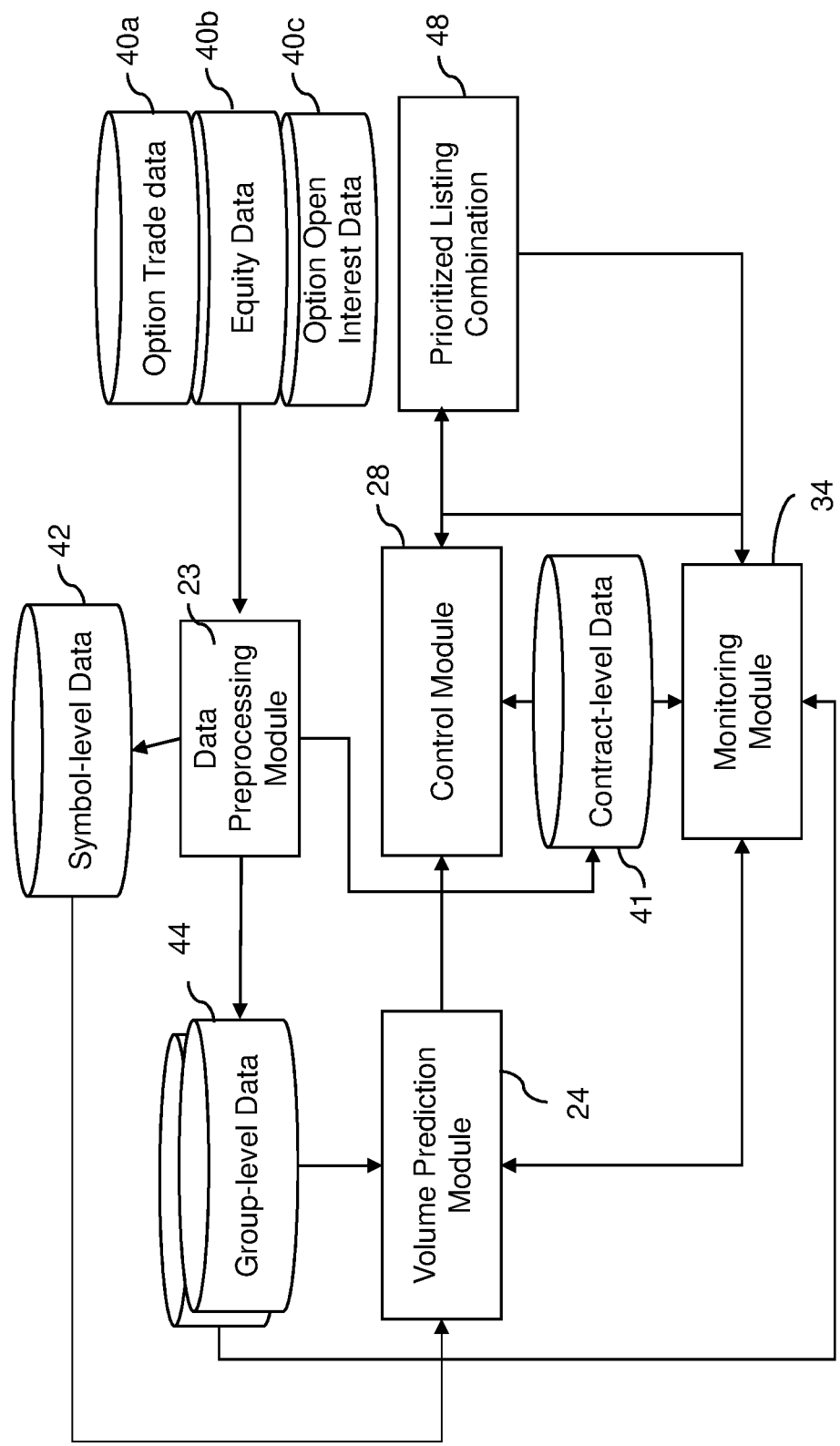
FIG. 4 illustrates a system diagram of a particular example application to an electronic trading platform that lists and executes option contracts according to certain example embodiments.
Figure 5:
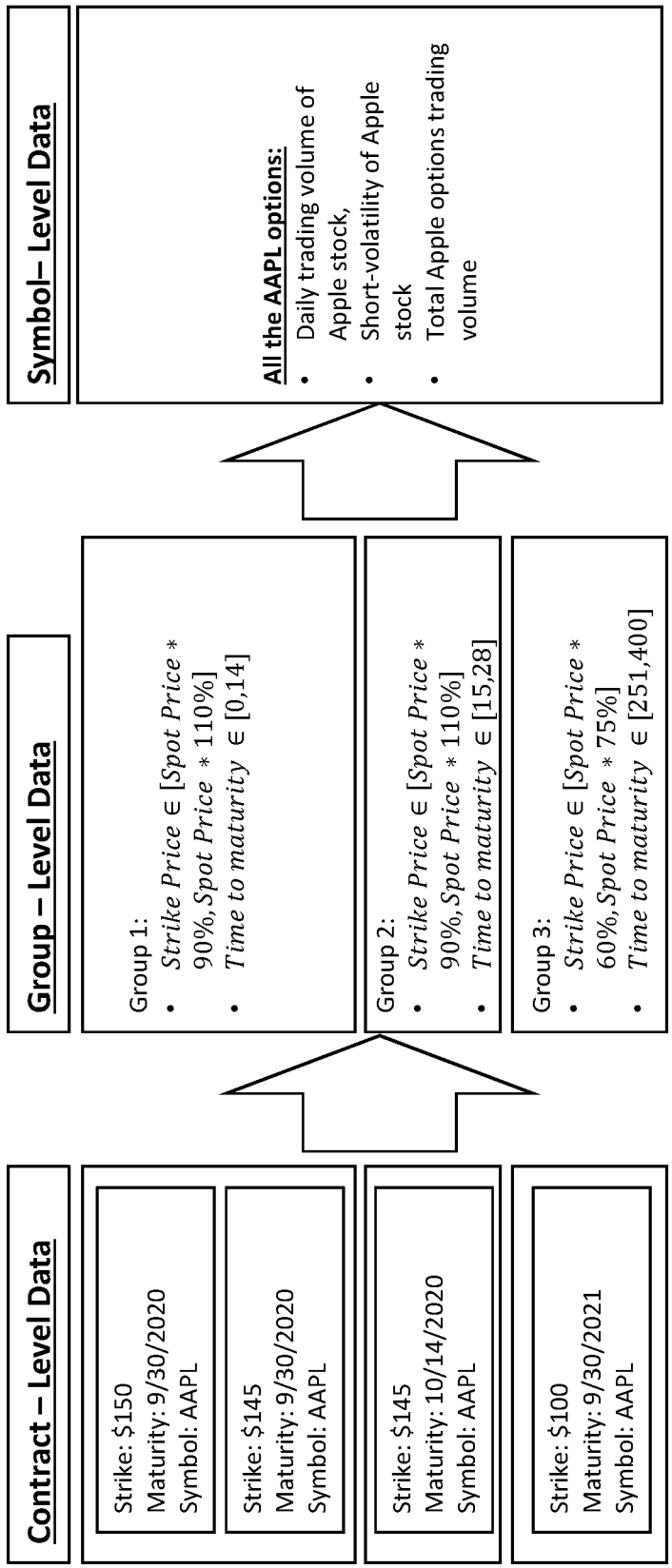
FIG. 5 is a diagram providing examples of different types of data sets processed in the example application of FIG. 4 according to example embodiments.
Figure 6:
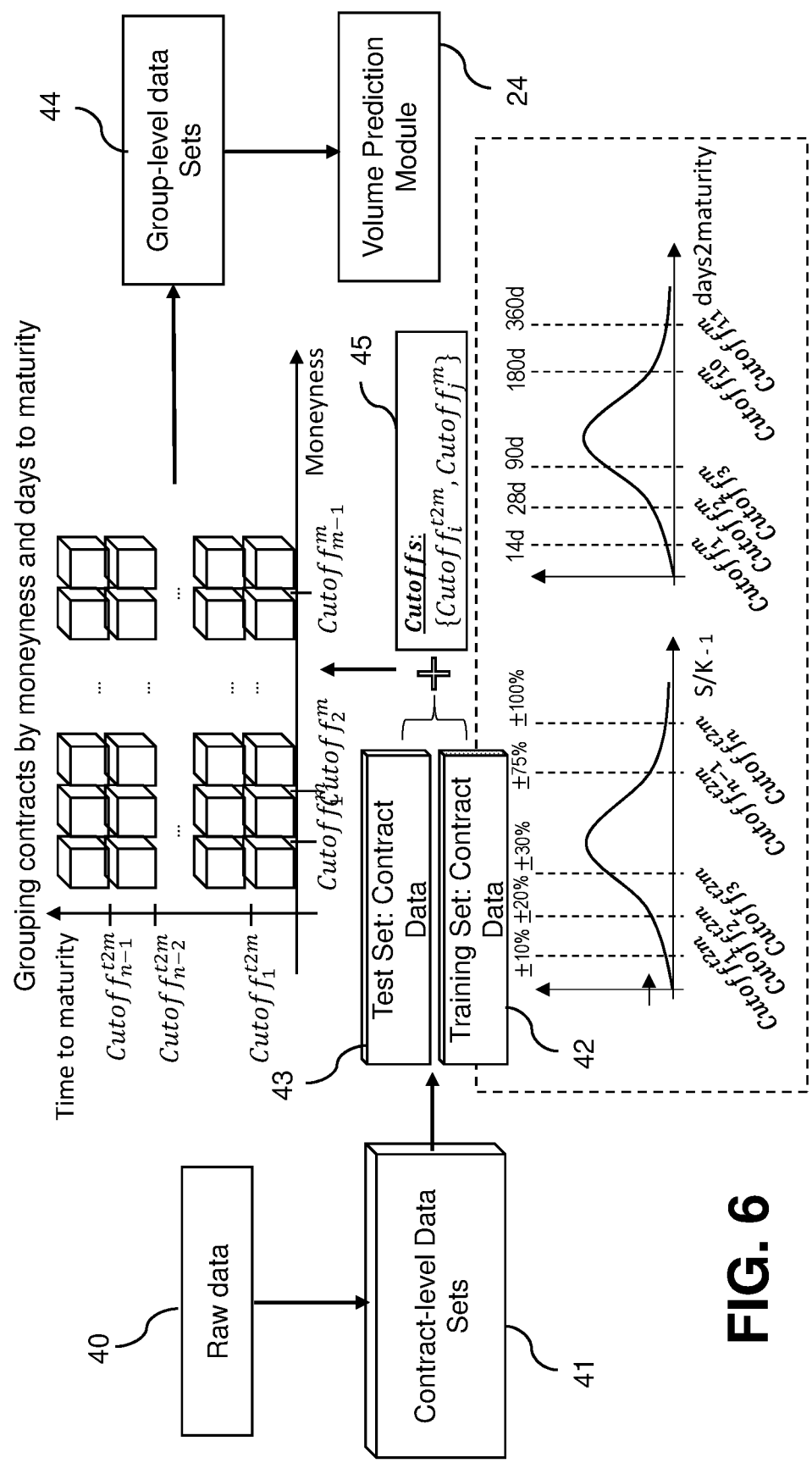
FIG. 6 is a diagram illustrating a process for grouping and testing data objects for use in predicting a data volume associated with different groups of objects according to example embodiments.
Figure 7:
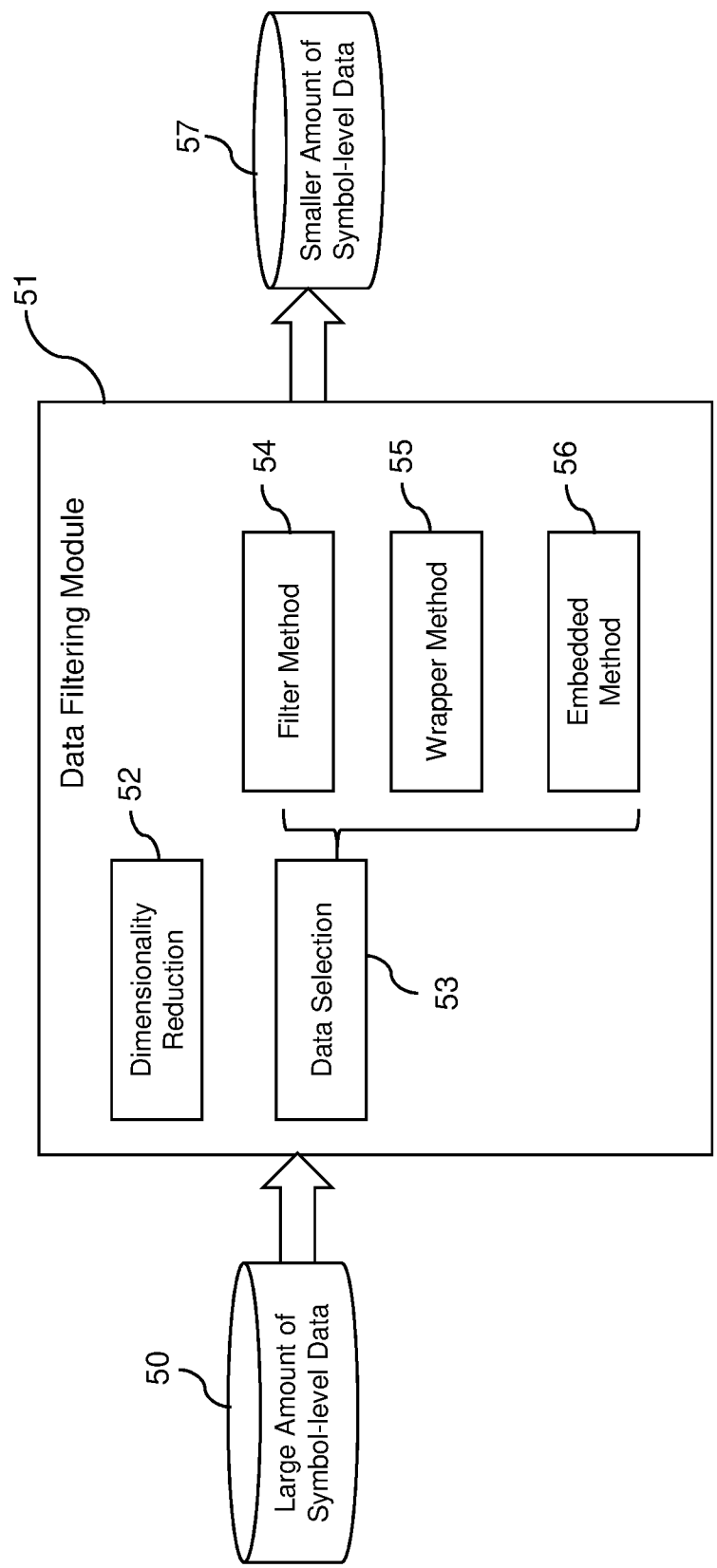
FIG. 7 is a diagram illustrating data filtering techniques to generate smaller data sets according to example embodiments.
Figure 8:
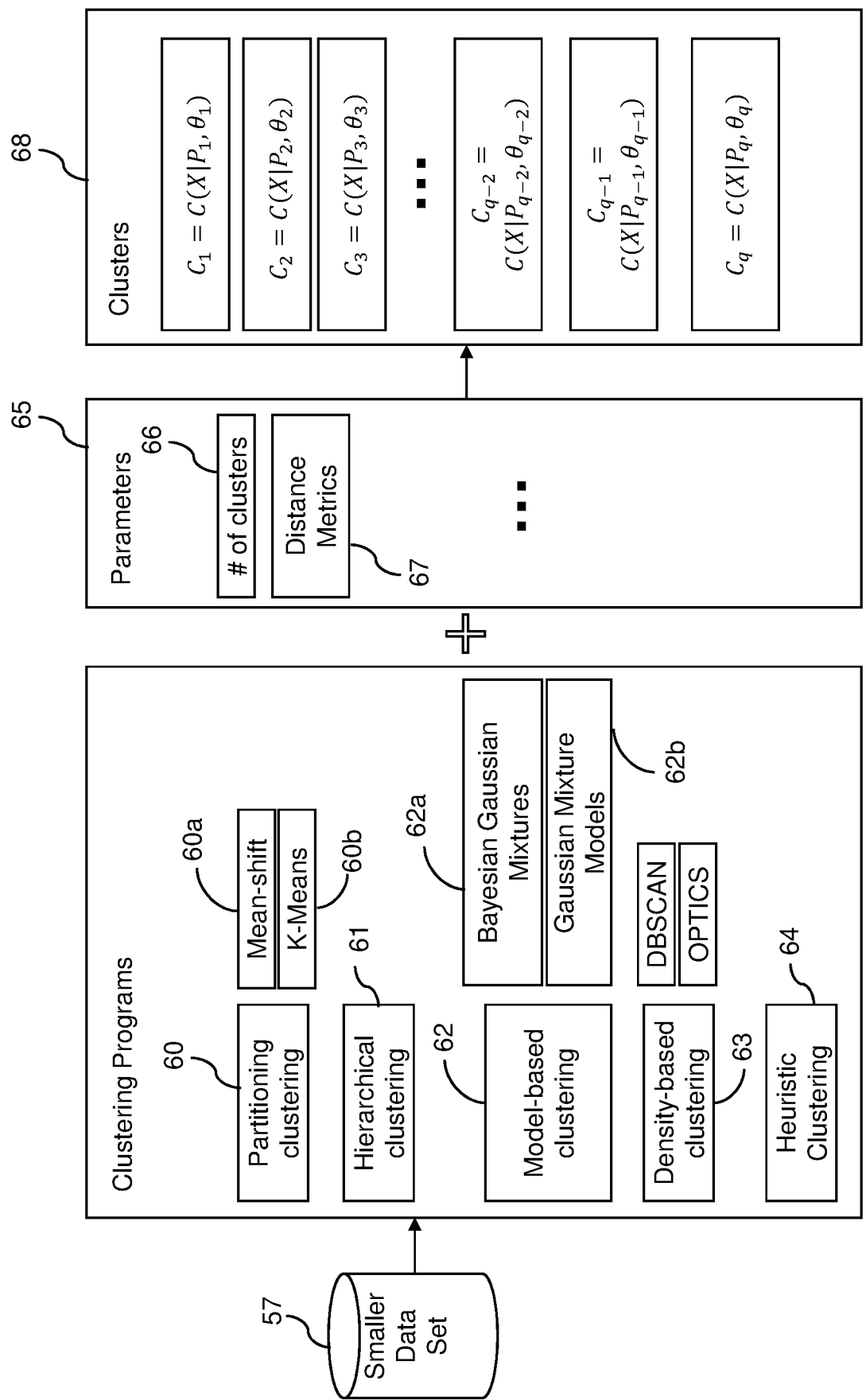
FIG. 8 is a diagram illustrating clustering category data sets into segments using one or more predictive machine learning models according to example embodiments.
Figure 9:
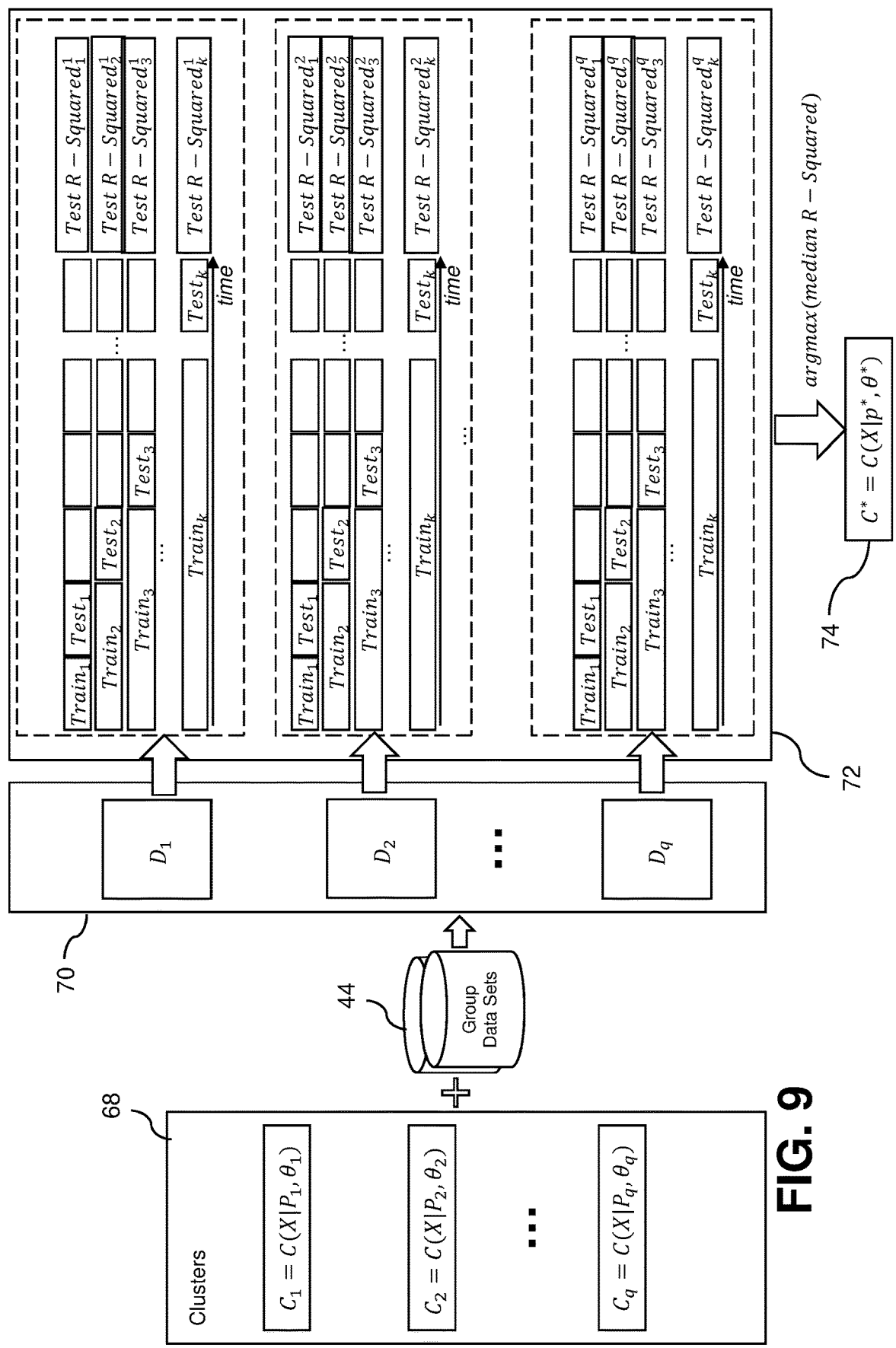
FIG. 9 is a diagram illustrating an example performance check of the clustered segments generated in FIG. 8 according to example embodiments.
Figure 10:
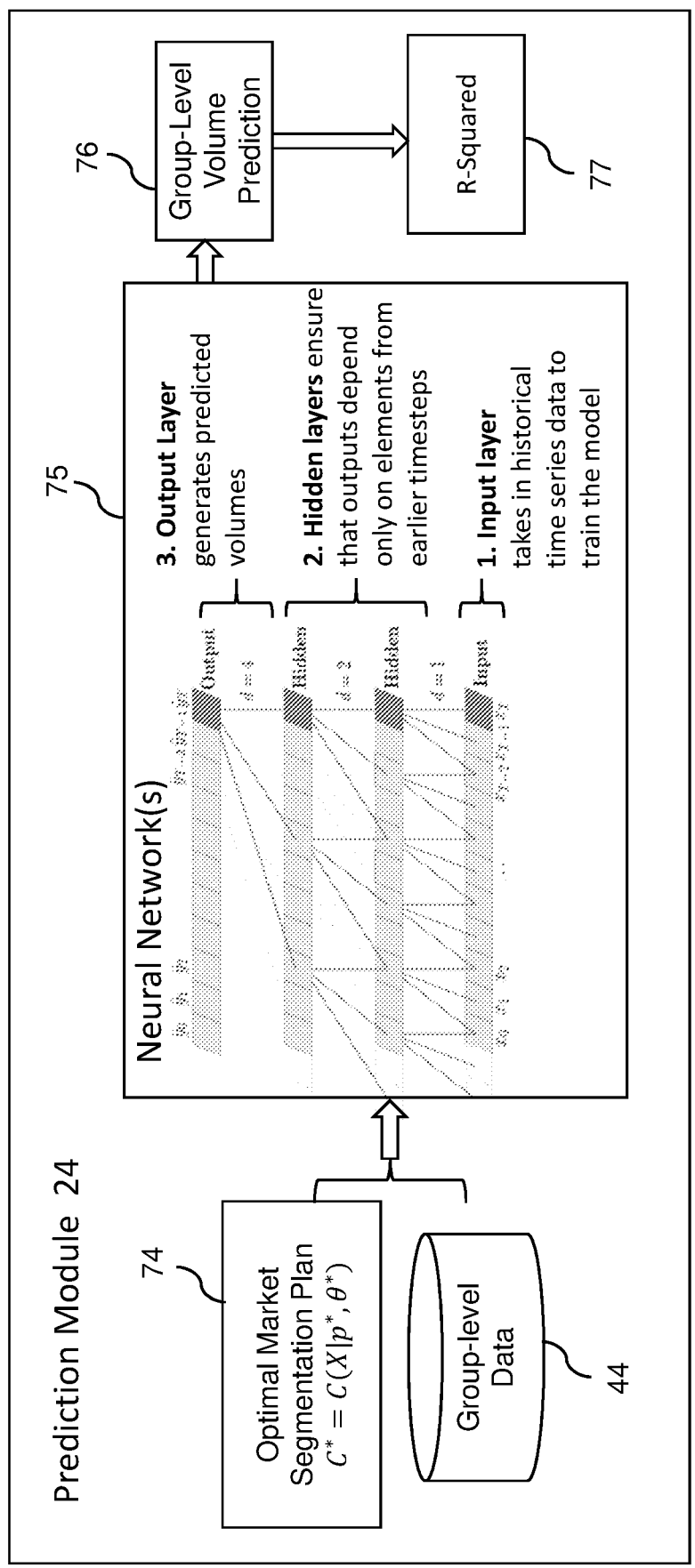
FIG. 10 is a diagram illustrating of neural network(s) that are used to generate a selection score for each of multiple groups of data objects according to example embodiments.
Figure 11:
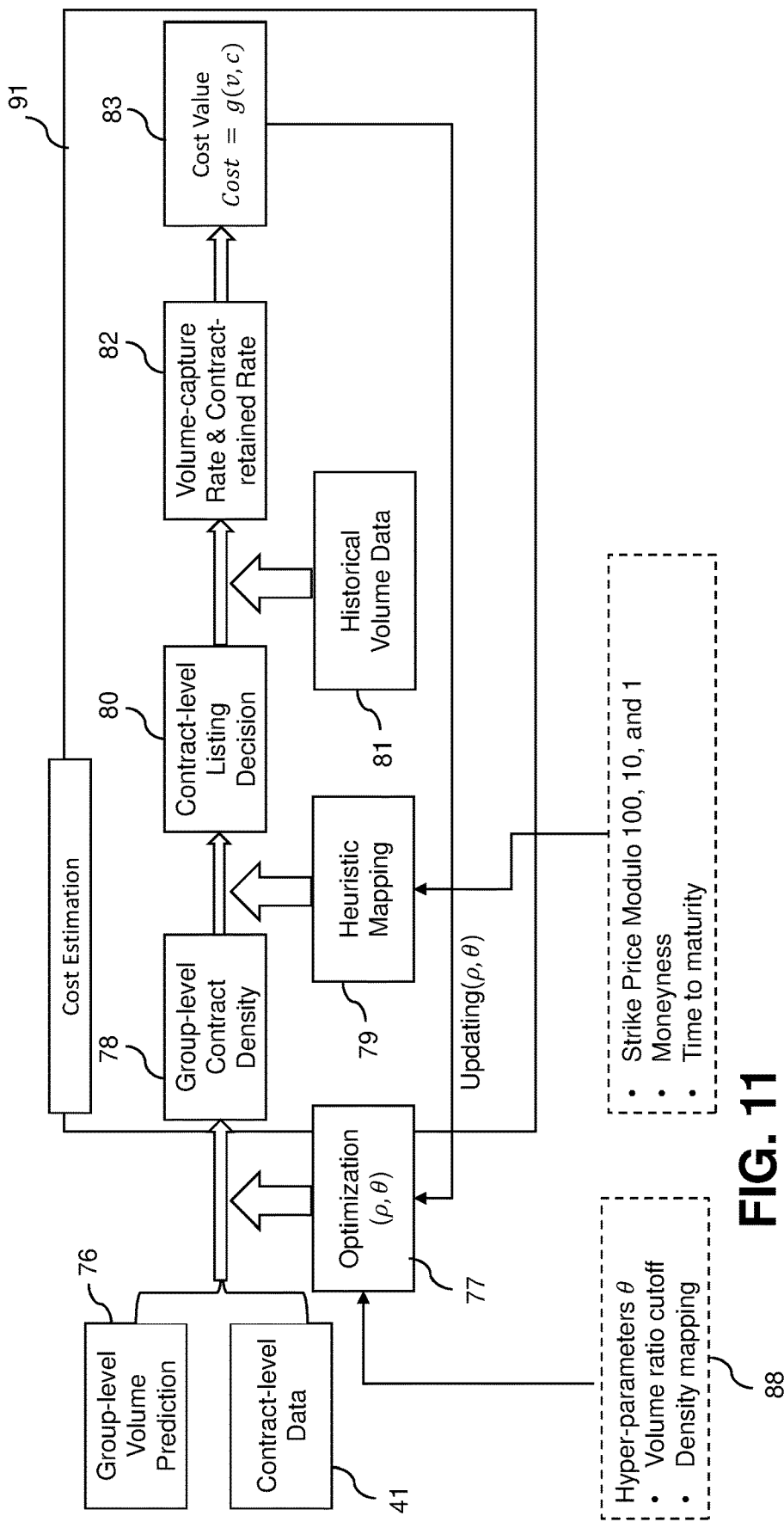
FIG. 11 is a diagram illustrating an example control system according to example embodiments.
Figure 12:
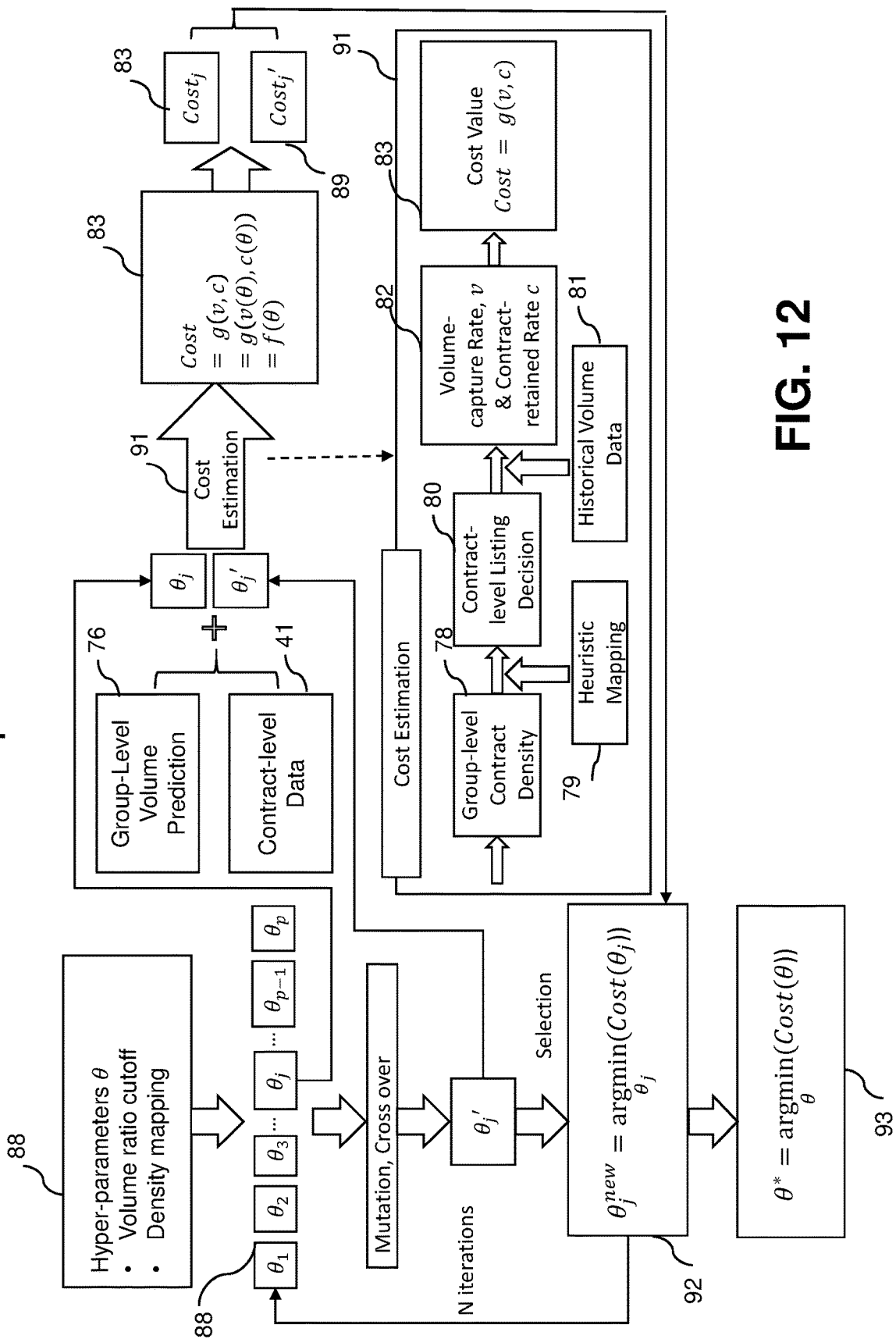
FIG. 12 is a diagram illustrating example optimization procedures for determining how many objects are permitted (e.g., a "quota") for each of multiple groups of data objects based on a selection score according to example embodiments.
Figure 14:
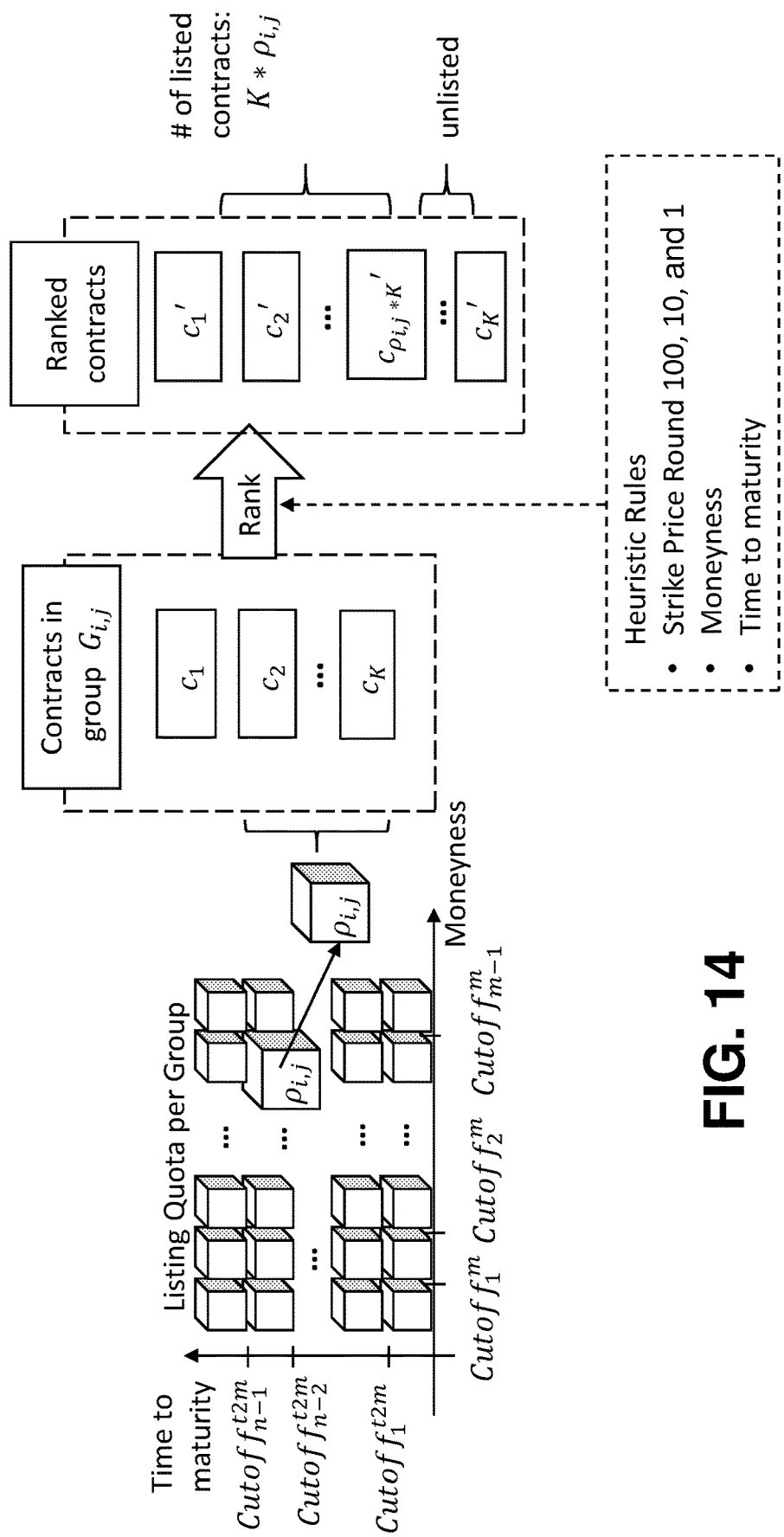
FIG. 14 is a diagram illustrating heuristic mapping of quotas for each group of data objects to prioritize permitted data objects according to example embodiments.
Figure 15:
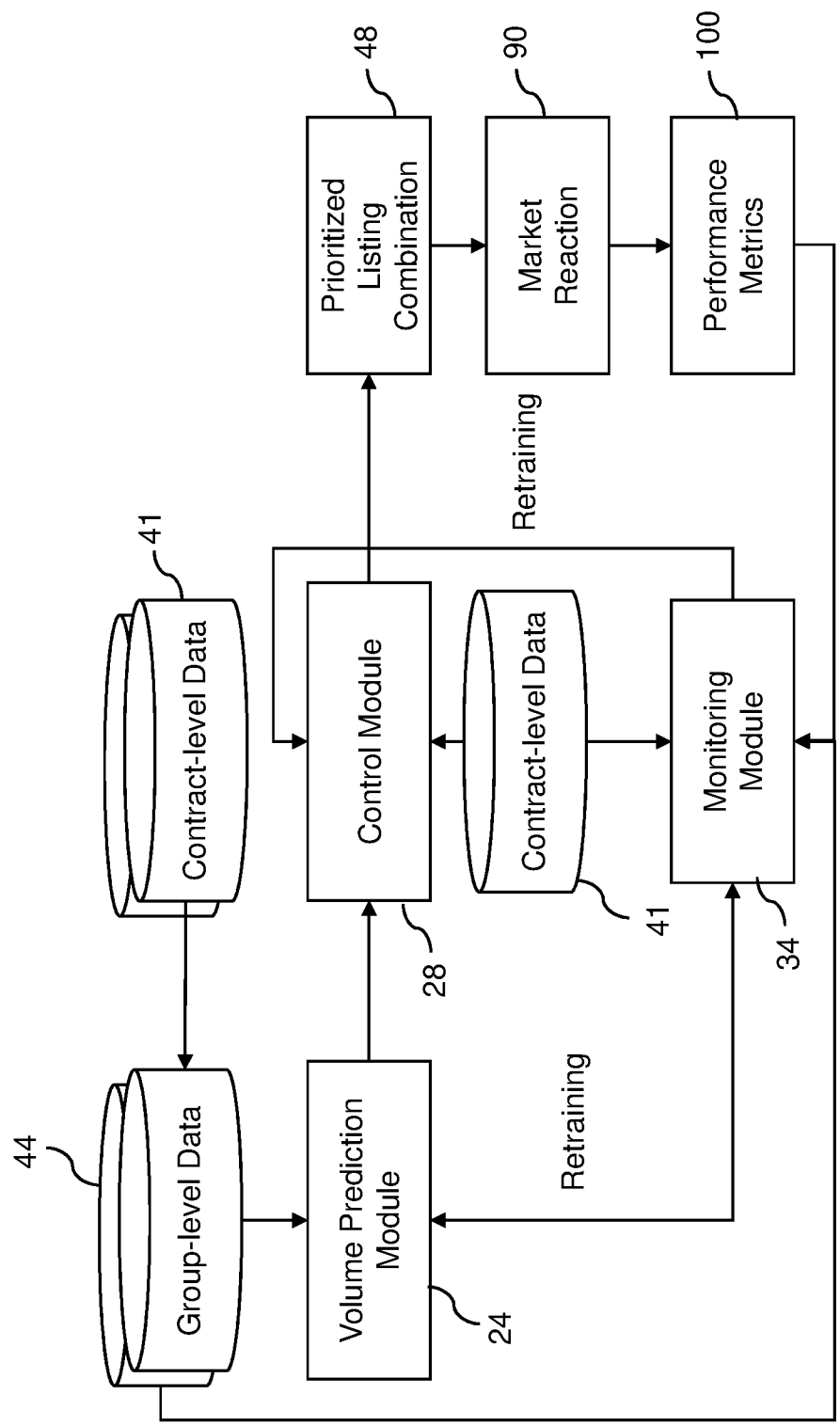
FIG. 15 is a diagram illustrating a monitoring system for retraining the control system according to example embodiments.

The relationship between the figures is now briefly outlined in advance of their detailed description. FIG. 1 is an architecture diagram that shows components of the described computer system including machine learning models; FIG. 2 illustrates a method performed in FIG. 1's architecture; FIG. 3 shows a general application of FIG. 1's architecture; FIG. 4 shows a specific application of FIG. 1's architecture; FIG. 5 shows different types of data sets processed in the application of FIG. 4; FIG. 6 shows an example technique for grouping and testing data objects processed in the application of FIG. 4 as part of the group definition in step S2 in FIG. 2; FIG. 7 illustrates data filtering to generate smaller data sets in the application of FIG. 4 as an example of data preprocessing 22; FIG. 8 shows clustering category data sets into segments using predictive machine learning as part of the prediction step S3 in FIG. 2; FIG. 9 illustrates a performance check of the clustered segments as part of the prediction step S3 in FIG. 2; FIG. 10 shows neural network(s) that generate a selection score for each group of data objects as part of the prediction step S3 in FIG. 2; FIG. 11 shows a control module used in the application of FIG. 4 as part of the permitted data object step S4 in FIG. 2; FIG. 12 illustrates optimization procedures for determining how many objects are permitted (e.g., a "quota") for each group of data objects based on a selection score in the control system of FIG. 12 as part of the permitted data objects step S4 in FIG. 2; FIG. 13 shows a determination of an example quota per group of data objects for the application of FIG. 4 as part of the prioritized permitted data objects step S5 in FIG. 2; FIG. 14 illustrates heuristic mapping of quotas for each group of data objects to prioritize permitted data objects as part of the prioritized permitted data objects step S5 in FIG. 2; FIG. 15 is a diagram that shows retraining the entire system, including the prediction and control system, in the context of the application of FIG. 4 as part of the monitoring and retraining steps S6-S8 in FIG. 2; and FIG. 16 shows an example computing system that may be used to implement the features shown in and described throughout this document, including those features shown in and described with reference to FIG. 1 through FIG. 15.

Description of Computer System—FIG. 1

FIG. 1 is a computer system diagram according to certain example embodiments. In many places in this document, including the description of FIG. 1, computer-implemented function blocks, functions, and actions may be implemented using software modules. It should be understood that function blocks, functions, and/or actions performed by software module(s) or processing node(s) are actually implemented by underlying hardware (such as at least one hardware processor and at least one memory device) according to program instructions specified by the software module(s). Details of an example computer system with at least one hardware processor and at least one memory device are provided in the description of FIG. 16. In addition, the described function blocks, functions, and actions may also be implemented using various configurations of hardware (such as ASICs, PLAs, discrete logic circuits, etc.) alone or in combination with programmed computer (s).

Computer system 12 receives and processes data from one or more data sources 16 labeled as $S_1, S_2, \ldots, S_N$. In FIG. 1, one or more databases 18 labeled as $DB_1, DB_2, \ldots, DB_N$ can be additional data sources and/or may store input data from data sources 16. In certain examples, the data from the various data sources may be stored in a data warehouse or data lake (not shown) that may then be queried and operated on by computer system 12.

Ultimately, computer system 12 is configured to receive and process information from an arbitrary number of data sources. In certain instances, the data sources may include internal data sources (e.g., that are operated by the same organization that is operating computer system 12). Data sources may include data wire service providers (e.g., a data "wire" service similar in the way Reuters is a news service). In certain instances, the data sources may be subscribed to by system 12. The data sources and the data formats for those data sources may be heterogeneous or homogeneous in nature, and as such, any type of data format may be acceptable.

Input data stored in the databases 18 may include different types of data and may be in any form including in tabular form with columns or in some other organized form of elements or nodes. Input data may include multiple, indexed data values, e.g., temperature data might have a list of temperature values in centigrade. Examples input data in the context of machine learning (ML) models (e.g., neural networks) data analysis include features, engineered features, and derived features. Virtually any type of data may be received and analyzed.

One or more transceivers and/or interfaces 20 receive input data sets from the database(s) 18 along with one or more target metrics and a desired number of synthesized data sets to be generated and output by the computer system 12 for a user or for another computer system. One or more hardware processors 22 and 24 are shown as examples. It is understood that all of the functions of the computer system may be performed using a processing system having one or more hardware processors 22 in a centralized fashion and/or using one or more dedicated hardware processors dedicated to perform certain functions of the computer system 12.

Using programs and data stored in one or more memories 24, the processor(s) 22 perform preprocessing of the input data into data categories, data objects, and groups of data objects as described below. The memor(ies) 24 store a prediction module 25 with one or more predictive machine learning (ML) models 26, which when executed by the processor(s) 22, analyze the preprocessed data and predict selection scores for groups of data objects for predetermined time periods. A control module 28, which when executed by the processor(s) 22, determines, using one or more control machine learning models 30, a number for each group of data objects indicating how many data objects are permitted for each group of data objects based on the selection score for each group of data objects. The control module 28 then prioritizes, using one or more decision-making machine learning models 32, the permitted data objects based on one or more predetermined priority criteria. The computer system 12 allocates computer system resources for the prioritized data objects.

A monitoring module 34, which when executed by the processor(s) 22, monitors activities of the computer system 12 to calculate performance metrics for each group of data objects and for data objects actually selected during the predetermined time period. In other words, the monitoring module 34 determines how well the prioritized data objects met the objectives of the computer system 12 (or other objectives depending on the application). For example, the objectives may include ensuring that the most relevant data objects in an application of the computer system are prioritized. In this situation, the computer system performs better when it correctly predicts and prioritizes the data objects that turn out to be the most relevant data objects in that application. In that situation, the allocation of computer system resources is optimized in contrast with expending computer system resources for less relevant data objects.

Accordingly, the monitoring module 34 adjusts, e.g., retrains, the one or more predictive machine learning models 26, the one or more control machine learning models 30, and the one or more decision-making machine learning models 32 based on test results and/or feedback from an application of the computer system 12 to improve their respective performances. This adjustment may be done multiple times via multiple iterations.

In certain example embodiments, the computer system 12 may be implemented in a cloud-based computer environment and may be implemented across one or more physical computer nodes (such as, for example, a computer node as shown in FIG. 16). In certain examples, different modules of the computer system 12 may be implemented on virtual machines implemented on corresponding physical computer hardware.

Description of Operation of the Computer System—FIG. 2

FIG. 2 is a flowchart showing example computer-implemented procedures implemented by the computer system 12 according to certain example embodiments.

In step S1, the transceiver(s)/interface(s) 20 receive over the data communications network 14 different types of input data from multiple sources 16 and 18 communicating with the data communications network 14. In step S2, the computer system 12 processes the input data and defines for each of multiple data categories, a set of groups of data objects for the data category based on the different types of input data. In step S3, the computer system 12 predicts, using one or more predictive machine learning models 26, a selection score for each group of data objects in the set of groups of data objects for the data category for a predetermined time period. In step S4, the computer system 12 determines, using one or more control machine learning models 30, a number for each group of data objects indicating how many data objects are permitted for each group of data objects based on the selection score for each group of data objects. In step S5, the computer system 12 prioritizes, using one or more decision-making machine learning models 32, the permitted data objects based on one or more predetermined priority criteria. In step S6, the computer system 12 executes the monitoring module 34 to monitor activities of the computer system 12 and to calculate performance metrics for each group of data objects and for data objects actually selected during the predetermined time period. In step S7, a decision is made whether to perform a further iteration of steps S2-S6 based on the performance metrics. If not, the procedure returns to step S1 to start with new input data. If so, retraining of one or more of the models is needed, and the flow proceeds to step S8. In step S8, the monitoring module 34 generates information to adjust, e.g., retrain, the one or more predictive machine learning models 26, the one or more control machine learning models 30, and the one or more decision-making machine learning models 32 to improve their respective performances.

Regarding steps S7 and S8 in FIG. 2, the monitoring module 34 may determine metrics for evaluating the performance of the prediction module 25. For example, monitoring module 32 may determine a difference or error between the predicted and actual selections scores for each group of data objects. If the difference or error exceeds a predetermined threshold, then the monitoring module 34 provides retraining information to the prediction module 25 to retrain one or more of the predictive machine learning models 26, which combines or uses that retraining information along with previously used model training data to generate new training data for further training of the models 25. As another example, the monitoring module 34 may determine metrics that evaluate the performance of the control module 28. If those metrics are below a certain threshold, then the monitoring module 34 provides retraining information to the control module 28 to retrain one or more of the control and/or decision making machine learning models 30 and 32, which combines or uses that retraining information along with previously used model training data to generate new training data for further training of those models.

It is understood below that references to one of the modules performing some action, operation, function, or the like, refers to the computer system 12 executing program instructions corresponding to the module to perform that action, operation, or function.

Further Description of Computer System—FIG. 3

FIG. 3 illustrates a diagram of the computer system 12 showing data communications between various computer and data storage entities shown in diagram of FIG. 1 according to certain example embodiments.

The data preprocessing module 23 receives three different types of raw data 40a, 40b, and 40c and preprocesses them to generate category data sets stored in memory 42, with the category data 42 being provided to prediction processor(s) 24, group data sets stored in memory 44, and object data sets are stored in memory 41. The prediction module 24 processes the group data sets as described in step S3 in FIG. 2 and predicts a selection score for each group of data objects in the set of groups of data objects for the data category for a predetermined time period. The prediction score is provided to the control module 28 which processes the score along with corresponding data objects from memory 41 to determine, using one or more control machine learning models 30, the number of data objects permitted for each group of data objects and the prioritized list of permitted data objects stored in memory 48.

That list from memory 48 along with the group data from memory 44 and the data objects from memory 41 are provided to the monitoring module 34 which monitors activities of the computer system 12 (or some other system) to calculate performance metrics for each group of data objects and for data objects actually selected during the predetermined time period. The monitoring module 34 provides feedback information corresponding to or based on the performance metrics to retrain the predictive machine learning model(s), the control machine learning model(s) and decision-making machine learning model(s) to improve their respective performances.

Description of an Example Application of the Computer System—FIG. 4

There are many specific applications that can benefit from the computer system 12. For example, in a retail shelf space optimization application, each data category may correspond with a category of groceries such as beverages, grains, personal care, etc. Each group of data objects may correspond with a brand within each category such as Special K™, Cheerios™, Honeycomb™, etc. in a cereal category. Each data object may correspond with a specific product listed on the shelf such as apple cinnamon cereal or Special K™.

One detailed application is now described for non-limiting illustration purposes. FIG. 4 shows an example application involving options listings on an electronic trading platform. A typical electronic trading platform can be configured to allow trading of many different items; as used here, when an item is described as "listed" for trading on an electronic trading platform, that means that the electronic trading platform is configured such that trading of that item can take place on the electronic trading platform.

In this example options listing application, each data category corresponds with an underlying asset such as a stock, an exchange-traded product (ETP), a bond, a currency, a commodity, etc. An option is a contract giving a buyer the right, but not the obligation, to buy (in the case of a call) or sell (in the case of a put) a certain amount of the underlying asset at a specific price on or before a certain date. Options contracts (also referred to simply as "options" or as "contracts") are classified as derivatives because they derive their value from their underlying asset. In this example options listing application, each possible option listing corresponds to a data object.

Data values associated with each option data object include an expiration data and a strike price which is the set price at which an option can be bought or sold when it is exercised. For call options, the strike price is where the underlying asset can be bought by the option holder. For put options, the strike price is the price at which the underlying asset can be sold.

In the context of options, it is possible to have thousands of option contracts for each single underlying asset, with each option contract either being a put or a call and having a different strike price, a different quantity, and/or a different expiration date. As just one example, it is possible to have thousands of different option contracts that have Apple stock as their underlying asset. For many electronic trading platforms on which options contracts are traded, the platforms are expected to handle all of the options contracts for thousands of underlying assets—in some instances, as many as ten thousand underlying assets, or more. Accordingly, the number of possible options contracts that correspond to ten thousand underlying assets is massive. To list that massive number of possible options contracts on an electronic trading platform requires massive computer system resources on the electronic trading platform including data communications bandwidth, memory storage, data processing capacity, computational speed, and power consumption.

But not all possible listings are relevant in terms of their likelihood of being traded. In fact, a significant percentage of possible listings do not have any trading volume and another significant percentage of possible listings only have a relatively small trading volume. The computer system shown in FIG. 4 reliably and accurately predicts which smaller subset of option contract listings are likely to be of significant interest to end users to trade and also adapts to rapidly changes in the options trading environment. As a result, computer system resources are allocated to list the smaller subset of options that have the largest trading volumes.

FIG. 4 is similar to FIG. 3 and operates in accordance with the procedures described in FIG. 2 with the following additional details. The category data corresponds to symbol level data, where the symbol refers to the symbol of the underlying asset. The data objects correspond to option contracts ("contracts"), and each group corresponds to groups of contracts that relate to a particular underlying asset. The volume prediction module 24 predicts the volume of trading activity for each of multiple contract groups for multiple assets. The prioritized contracts are listed on the electronic trading platform, and the actual options trading activity on the electronic trading platform is monitored by the monitoring module 34 and used to adapt the various machine learning models as described above. The computer system 12 may be separate from, but in communication with, the electronic trading platform, or the computer system 12 may be a part of the electronic trading platform.

Description of Example Objects, Groups, and Categories—FIGS. 5 and 6

FIG. 5 is a diagram providing specific examples of objects, groups, and categories using the examples of asset symbol data, option contract data, and contract grouping data processed in the example application of FIG. 4 according to example embodiments. The objects, groups, and categories are not limited to those shown and described. In this example, the symbol for Apple is AAPL. Initially as a part of step S2 in FIG. 2, the data preprocessing module 23 generates options contract-level data based on option contract trade data 40a. The example data here includes the option contract strike price, maturity date, and symbol (APPL) of the underlying stock (Apple). The option contract level data for Apple is shown in three blocks in FIG. 5. The first block has two different strike prices at the same maturity date of Sep. 30 19 2020 with strike prices $150 and $145. The next example block shows an option contract with a strike price of $145 and a maturity date of Oct. 14, 2020. The third block shows a strike price of $100 at maturity date of Sep. 30, 2021. The contract-level data identifies a unique contract.

As a further part of step S2 in FIG. 2, the data preprocessing module 23 processes the contract-level data along with equity data 40b and option open interest data 40c and generates group-level data using "moneyness," which is the ratio of the stock price/option strike price for the option contract on the stock, and time to maturity for the option to generate "cut-off groups" of option contracts. Example groups 1-3 are shown in FIG. 5. Each cut-off group has different moneyness and maturity date characteristics as compared to the other cut-off groups. The group level data in FIG. 5 includes examples for three different groups for options for Apple (APPL). Group 1 includes a strike price (price when exercising the option) that values between 90% of the spot price (current market price) and 110% of the spot price ($180-220). The time to maturity is somewhere between zero and 14 days. In group 2, the strike price values between 90% of the spot price and 110% of the spot price as in group one, but the time to maturity is between 15 and 28 days. In group 3, the strike price values between 60% of the spot price and 70% of the spot price. The time to maturity is between 251 and 400 days. These examples provide an example context for the types of contracts and groups that may be formed for analysis.

FIG. 6 illustrates an example process (also performed as a part of step S2 of FIG. 2) where the data preprocessing module 23 groups and tests data objects (e.g., option contracts) for use in predicting a data volume associated with different groups of objects (e.g., groups of option contracts) according to example embodiments. Referring also to FIG. 4, the raw data 40a, 40b, and 40c are used to generate contract level data sets 41 from which test sets of contract data 43 and training sets of contract data 42 are generated. A set of cutoffs (different times to maturity along the vertical axis in the graph and different moneyness on the horizontal axis) are applied to the test and training sets to generate cut-off groups of option contracts 44. Each cut-off group has different moneyness and maturity date characteristics as compared to the other cut-off groups. The group level data is processed by the volume prediction processor(s) 24 to predict, using one or more predictive machine learning models, a selection score for each cut-off group for Apple options for a predetermined time period.

In the example shown in FIG. 6, moneyness groups are determined by predetermined ranges of absolute values of moneyness. For instance, if the predetermined cutoff values are 0.1, and 0.2, then moneyness values in the range −0.1-0.1 are grouped together, values in range −0.2-0.1 and 0.1-0.2 are grouped together, and values below −0.2 and above 0.2 are grouped together. Days to maturity groups are determined by predetermined cutoff values. For instance, if the cutoff values are 14 days, 28 days, and 90 days, then days to maturity values up to 14 days are grouped together, values in the range 15-28 days are grouped together, values in the range 29-90 days are grouped together, and values above 90 days are grouped together.

Given the detailed grouping and group testing example in FIG. 6 and referencing also FIGS. 4 and 5, the data preprocessing module 23 processes the group level data for all of the stock's option contracts (in this example, all of the Apple option contracts) and generates a set of symbol data for Apple option contracts by aggregating group-level data, such as total trading volume of contracts in each group and the distribution characteristics of the group-level trading volume (mean, min, standard deviation, skewness, etc). One example set of symbol data shown in FIG. 5 includes the daily trading volume of Apple stock, the short volatility of Apple stock, and the total trading volume of Apple options contracts. Another example set of symbol data might include the total trading volume of Apple options, a Put-Call ratio of all the Apple options, and a total open interest of Apple options. Other example sets of symbol data may be used.

Description of a Data Filtering Stage of a Segmentation Process—FIG. 7

After preprocessing the raw data as described above in conjunction with FIGS. 4-6, the computer system 12 generates predictions using prediction processes implemented by the volume prediction module 24 as part of step S3 in FIG. 2. High level prediction processes include market segmentation processes and machine learning (ML) training processes. Market segmentation introduces a layer of customization to different options by segmenting the market and clustering options of similar underlying assets together. As a result, options in different market segments can be modeled separately. For example, one set of ML models may be trained for options of healthcare companies, and another set of ML models may be trained for options of tech companies. Training one or more predictive machine learning models for each market segment separately and then evaluating the overall prediction accuracy of each model for that market segment permits identification and selection of an optimal market segmentation plan.

Market segmentation may also include data filtering to reduce the amount of data to be processed. FIG. 7 illustrates data filtering techniques to generate smaller data sets that may be implemented as part of step S3 in FIG. 2 according to example embodiments. A very large amount of symbol-level data 50 (see the examples of symbol-level data in FIG. 5) is processed by the volume prediction module 24 to perform a data filtering (reduction) process 51 which includes dimensionality reduction 52 and data selection 53 using a filter method 54, a wrapper method 55, and/or an embedded method 56 to produce a considerably smaller amount of symbol-level data 57.

The wrapper method 55 uses a predictive model to score data subsets. Each new data subset is used to train a model, which is tested on a testing (a "hold-out") data set. Counting the number of mistakes the model makes on that hold-out data set (the error rate of the model) gives the score for that data subset.

The filter method 54 uses a proxy measure instead of the error rate of the model to score a data subset. Common measures include the mutual information, the pointwise mutual information, Pearson product-moment correlation coefficient, relief-based algorithms, and inter/intra cluster distance or scores of significance tests for each class/feature combinations.

The embedded method 56 is a catch-all group of techniques which selects a smaller amount of symbol-level data as part of the model construction process.

Description of Clustering Data Categories into Segments—FIGS. 8 and 9

Cluster analysis produces market segmentations and includes grouping a set of data categories in such a way that data categories in the same cluster are more similar (in some sense) to each other than to those in other clusters. FIG. 8 is a diagram illustrating the clustering category data (e.g., symbol-level data from FIG. 5, 6, or 7) into segments (e.g., market segments in the example application of FIG. 4) using one or more predictive machine learning (ML) models that may be implemented as part of step S3 in FIG. 2 according to example embodiments. In this example, the clustering operations (market segmentations) are performed by volume prediction module 24 which generates cluster segments of different stocks using the symbol level data where each cluster segment reflects one or more characteristics, e.g., stock price dynamics, of the stocks clustered in that segment.

The volume prediction module 24 trains ML clustering models 26 with training data for each cluster segment with the objective of minimizing the overall prediction error of the cluster's predicted total trading volume in a predefined future time period (e.g., 1 week). The original data is split into a training data set and a testing data set based on a cut-off date. The training set is used to train the model 26, and the data set is used to guide the model to learn the optimal values of its parameters. The testing set is used in the model testing/validation, and the model has no insight about the data in the testing set through the entire training process. This is like training a chess player by showing the player historical chess games, and then testing how well the chess player could perform in a series of future chess games.

As an example, data sets from one time period in the past may be used as training data, and data sets in a later time period may be used as testing data. After training, the predictive ML clustering model having a highest model performance is selected.

FIG. 8 shows different example data clustering computer programs corresponding to example predictive ML models including a partitioning clustering model 60 (e.g., mean shift and K-means), a hierarchical clustering model 61, model-based clustering 62 such as Bayesian Gaussian Mixture and Gaussian Mixture models, density-based clustering 63 like density-based spatial clustering of applications with noise (DBSCAN) and ordering points to identify the clustering structure (OPTICS), and heuristic clustering 64.

The appropriate clustering ML model algorithm along with clustering parameters 65, e.g., the number of expected clusters 66, distance metrics 67, and others such as a density threshold, are used to generate a set of clusters 68 $C_1$-$C_q$. The parameters 65 depend on the specific data set and the end use of the results. Clustering is an iterative, multi-objective optimization process that involves trial and failure requiring modification of the clustering model parameters until the result achieves the desired properties. The set of clusters 68 $C_1$-$C_q$ is represented as $C_1 = C(X|P_1, \theta_1)$, $C_2 = C(X|P_2, \theta_2)$, ..., $C_q = C(X|P_q, \theta_q)$, where X is the input data to the clustering model, which in the example, is the smaller symbol-level data set 57, P is the clustering model 26 used such as one of 60-64, and θ is a corresponding clustering model parameter 65.

Each cluster set C in clusters 68 $C_1$-$C_q$ represents an instance of market segmentation which assigns each symbol to a market segment. The predictive machine learning model is trained by market segment, so that means each market segment has its own predictive model 26.

FIG. 9 is a diagram illustrating an example performance check of the clustered segments generated in FIG. 8 that may be implemented as part of step S3 in FIG. 2 according to example embodiments. The volume prediction processor(s) 24 process the set of clusters $C_1$-$C_q$ 68 with the group level data 44 to check the performance of market segmentation and select the best ML model/algorithm and parameter settings tested. This checking is referred to as "cross validation" and involves training each ML model/algorithm multiple times with different variations of training data 70 $D_1, D_2, \ldots, D_q$. In this example, the training data 70 $D_1, D_2, \ldots, D_q$ includes group data sets 44 and the cluster/segmentation results 68 before a certain date in the past. The difference among the training data D1, D2, ..., Dq is the market segmentation results. D1, D2, ..., Dq are denoted as "decorated" training data sets. Essentially, each decorated data set now has one additional column on top of the group-level data sets indicating the market segmentation it belongs to.

For each training iteration, each ML model/algorithm is tested with a different subset of the training data, and a performance metric $R^2$ is generated for that training iteration. For example, assume there are five training data sets. Each ML model/algorithm is trained using four of the five sets of training data. This is shown diagrammatically in block 72.

Assume each ML model/algorithm is to be evaluated over 6 iterations of training. The training data is divided into 7 sub-periods (e.g., 2014-07-01 to 2014-12-31, 2015-01-01 to 2015-06-30, ..., 2017-07-01 to 2017-12-31). Each decorated dataset (D1, D2, ..., Dq) is trained using only the first period data (e.g., 2014-07-01 to 2014-12-31), and a corresponding performance metric $R^2$ is calculated using the second period data (e.g., 2015-01-01 to 2015-06-30). This is followed by training each decorated dataset using the combination of first and second period data (2014-07-01 to 2015-06-30), and the corresponding performance metric $R^2$ is calculated using the third period (e.g., 2015-07-01 to 2017-12-31). This process repeats, e.g., for a total of six iterations in this example. The result after the prescribed iterations are completed produces the optimal market segmentation plan $C^*=C(X|p^*,\theta^*)$ labeled 74 in FIG. 9.

Description of Volume Predication—FIG. 10

For the example application in FIG. 4, the goal of the volume prediction process is to identify and select those contract groups having the highest probability of being selected for trade (i.e., the highest trading volume) by end users on the electronic trading platform. FIG. 10 is a diagram illustrating the prediction module 24 using neural network(s) 75 to generate a selection score (e.g., a predicted volume) for each of the groups of data objects (e.g., each group of option contracts) that may be implemented as part of step S3 in FIG. 2 according to example embodiments. The optimal market segmentation plan $C^*=C(X|p^*,\theta^*)$ at 74 is combined with the group/contract level data 44 and processed using one or more neural networks 75 (an example of a predictive machine learning model) to generate a predicted trading volume for each option contract group for a predetermined future time period, e.g., next week.

At the neural network input layer (1), historical time series data is used to train the neural network model. The hidden layer(s) (2) of the neural network generate outputs that depend only on data from earlier time series data. The neural network output layer (3) generates a predicted volume 76 for each option contract group. Then, the prediction processor (s) generate a selection score $R^2$ 77 for the predicted volume 76 for each option contract group. The selection score $R^2$ is calculated by comparing the predicted value with the actual value and represents the proportion of the variance for the actual future trading volume that is explained by the prediction model.

Description of the Control System 28—FIGS. 11-14

The following is a brief overview of the operations of the control module 28 that may be implemented as part of step S4 in FIG. 2. After the contract group volume predictions are generated, the control system 28 processes the contract group level volume predictions 76 and the contract level data 41, using one or more control machine learning models 30, to generate a "quota" for each option contract group. The quota is a number for each contract group indicating how many contracts for that group are permitted (i.e., how many contracts may be considered for listing on the electronic trading platform) based on the selection score for that contract group. From the permitted contracts for each contract group, the control module 28 prioritizes, using one or more decision-making machine learning models 32, the permitted contracts for that group for listing on the electronic trading platform based on one or more predetermined priority criteria. Detailed operations performed in the control module 28 are now described using FIGS. 11-14.

FIG. 11 is a diagram illustrating an example control module 28 that may be implemented as part of step S4 in FIG. 2 according to example embodiments. The group level volume predictions 76 from FIG. 10 are combined with contract level data 41. For example, for each contract, its corresponding group's predicted volume may be included as an additional column to the contract-level data. The combination results are optimized using a computer-implemented optimization process 77 described below in conjunction with FIG. 12 (e.g., using volume ratio cutoff and/or density mapping procedures) and then processed using a computer-implemented, contract group density algorithm 78 to generate quotas (i.e., a quota defines a density) for each contract group. Computer-implemented heuristic mapping 79 is applied to the permitted contracts to prioritize permitted contracts in each group. In the example shown in FIG. 11, strike price modulus, moneyness, and time to maturity for the prioritized contracts are used in the heuristic mapping 79. One or more decision-making machine learning models used in the contract-level listing decision module 80 is used to select which of the prioritized contracts will be listed on the electronic trading platform for a future predetermined time period.

Processing module 82 (labeled volume-capture rate and contract-retained rate) evaluates the performance of the control module 28 by back-testing the control module's prioritized contracts listing decision against the actual trading volume to calculate a trading volume-capture rate as well as a contract-retained rate. A cost updating module 83 calculates a cost value Cost using actual, historical contract trading volume data 81 from the electronic trading platform and the calculated trading volume-capture rate and contract-retained rate output from processing block 82. The actual, historical contract trading volume data 81 includes the contracts selected during the back-tested period. The cost value is negatively related to the actual, historical contract trading volume and is positively related to the contract retention rate during a back-tested period. The cost value is used to update hyper-parameters 88 for the control system 28. Hyper-parameters are parameters that configure the high-level control model structures, such as the percentage of contracts to be retained (cutoffs) if a volume ratio hits a given threshold. A group-level volume ratio is the % of weekly trading volume occurred on all the option contracts of a certain symbol contributed by the contracts in a given group. An example of volume ratio is the trading volume in particular group of AAPL options/a total of trading volume of AAPL options. Another example hyper-parameter includes a density value corresponding to each volume ratio.

FIG. 12 is a diagram illustrating example computer-implemented optimization procedures for determining how many objects are permitted (e.g., a "quota") for each of multiple groups of data objects based on a selection score that may be implemented as part of step S4 in FIG. 2 according to example embodiments. First, the optimization processing procedures assemble a population of sets of hyper-parameters 88 in FIG. 11 ($\theta_1$ through $\theta_p$), where each $\theta_i$ represents a single instance of hyper-parameters 88 (e.g., volume ratio cutoff and density value corresponding to each volume ratio). Second, the initial population of hyper-parameters is mutated a by "mating" the current population. "Mating" involves taking certain values from an instance $\theta_i$ and taking other values from instance $\theta_j$ to create a new instance $\theta_j'$. Third, each pair of original and mutated instances of hyper-parameters $\theta_j$ and $\theta_j'$ are fed into the optimization process 77 in the control system 28 shown in FIG. 11. Then, the cost estimation process 91 (see the dashed line from the cost estimation error 91 to the cost estimation block 91 described in conjunction with FIG. 11) calculates the cost value 83 associated with each instance of hyper-parameters. A selection process 92 then selects the hyper-parameter instance $\theta_j^{new}$ with a lower cost value and replaces the original hyper-parameter instance $\theta_j$ with $\theta_j^{new}$ in the population. These steps are reiterated N times for the rest of hyper-parameter instances in the population. Finally, the optimal hyper-parameter instance $\theta^*$, labeled 93, with the lowest cost value in the population at the $N^{th}$ iteration, is chosen for input to the cost estimation process 91 shown in FIG. 11.

FIG. 13 is a diagram illustrating an example determination of how many objects, here contracts, are permitted (a "quota") for each of multiple groups of contracts (labeled G1-Gn) based on a selection score that may be implemented as part of step S4 in FIG. 2 according to example embodiments. In this example, if the percentage of predicted trading volume for contract group G1 is greater than or equal to 50%, then a decision is made to list 100% of the strikes on a waiting list, i.e., a quota of 50 for a group trading volume of 500 contracts. If the percentage of volume traded for a contract group G2 is between 50% and 25%, then a decision is made to list 80% of the strikes on a waiting list, i.e., a quota of 40 for a group trading volume of 250 contracts. If the percentage of volume traded for a contract group Gn is less than 25%, then a decision is made to list 50% of the strikes on a waiting list, i.e., a quota of 10 for a group trading volume of 10 contracts.

FIG. 14 is a diagram illustrating heuristic mapping of quotas for each group of data objects, here option contracts, to prioritize permitted contracts that may be implemented as part of step S5 in FIG. 2 according to example embodiments. Heuristic mapping is a decision-making ML model 32. The model consumes contract level data (e.g., moneyness, time-to-maturity, strike price's trailing zeros, etc.) of all the K contracts ($C_1, C_2, \ldots, C_K$) in the given group with a quota of ($K*\rho_{i,j}$) to produce the ranked contracts $C_1', C_2', \ldots, C_K'$ that are selected for listing on the electronic trading platform. The contracts with higher ranking are prioritized for listing on the electronic trading platform, and the contracts with lower rankings may not be listed to save system resources.

Starting with a listing quota per contract group determined, for example, as described in FIGS. 12 and 13, heuristic rules are used by the control module 28 as part of step S5 in FIG. 2 to prioritize or rank the contracts $C_1$, $C_2, \ldots, C_K$, to produce the ranked contracts $C_1'$, $C_2', \ldots, C_K'$ that are selected for listing on the electronic trading platform. The number of contracts to be listed is defined by the group quota $K*\rho_{i,j}$. Example heuristic rules include prioritizing the contracts $C_1, C_2, \ldots, C_K$ using strike price (e.g., prioritize contracts having a strike price closer to the spot price), moneyness (e.g., prioritize contracts that have more favorable moneyness ratios), and time to maturity (e.g., prioritize contracts that are closer to maturity). Of course, many other types of heuristic rules may be used. Unprioritized contracts are not selected for listing on the electronic trading platform.

Description of the Monitoring System 34—FIG. 15

FIG. 15 is a diagram illustrating the monitoring module 34 retraining ML models in the control module 28 and in the volume prediction module 24 as part of steps S6-S8 in FIG. 2 according to example embodiments. The monitoring module 34 collects actual contract trading information from the electronic trading platform shown as market reaction 90, calculates performance metrics 100 for each contract group and for individual contracts actually selected during the predetermined time period, and uses those metrics to determine if it is necessary to retrain the one or more predictive machine learning models 26, the one or more control machine learning models 30, and the one or more decision-making machine learning models 32 (which include neural networks) used in the volume prediction system 24 and control system 28 to improve their performances.

Regarding steps S7 and S8 in FIG. 2, the monitoring module 34 may determine metrics for evaluating the performance of the volume prediction module 25. For example, the monitoring module 32 determines a difference or error between predicted and actual trading volume for each group of option contracts. If the difference or error exceeds a predetermined threshold, then the monitoring module 34 provides retraining information to the prediction module 25 to retrain one or more of the predictive machine learning models 26, which combines or uses that retraining information along with previously used model training data to generate new training data for further training of the models 25. As another example, the monitoring module 34 determines metrics that evaluate the performance of the control module 28. Example performance metrics for the example application related to FIG. 4 might include an electronic trading platform's trade conversion rate and the electronic trading platform's market share (% of trades in the U.S. option market actually traded on the target electronic trading platform). If those performance metrics are below a certain threshold, then the monitoring module 34 provides retraining information to the control module 28 to retrain one or more of the control and/or decision making machine learning models 30 and 32, which combines or uses that retraining information along with previously used model training data to generate new training data for further training of those models.

Case Study

A case study was performed on the exchange-traded fund QQQ, which is based on the Nasdaq-100 Index. Using the technology described above in FIGS. 4-15, the volumes were predicted for different contract groups for QQQ. The prediction results matched well with the actual QQQ option contract trading volume for one or more days in the future. Although the predicted volume did not always capture some extreme values, the predicted volume did capture the general distribution pattern of the contracts for a given day. For example, one day, Jan. 2, 2019, there were 1483 possible different option contracts for QQQ (different strike price and/or expiration date). The number of QQQ contracts predicted to have the highest volume for that day was 755. So rather than having to list all 1482 QQQ contracts, only 755 QQQ contracts having the highest likelihood of being traded were listed. This saved 49% of the computer resources that would otherwise have been used to list all 1483. Some of the QQQ contracts that were not predicted were actually traded but at a relatively small volume compared to the accurately predicted volume. Evaluating the performance across time, the proposed technology saved 40% of the computer system resources on average and captured more than 80% of the market volumes for most of the days tested in the case study. These computer system resource savings are significant and increase exponentially when applied to the many option contracts (for the many underlying assets) listed on an electronic trading platform.

Description of an Example Computing System—FIG. 16

FIG. 16 shows an example computing system that may be used in some embodiments to implement features described herein. An example computing device 500 (which may also be referred to, for example, as a "computing device," "computer system," or "computing system") includes one or more of the following: one or more hardware processors 502; one or more memory devices 504; one or more network interface devices 506; one or more display interfaces 508; and one or more user input adapters 510. Additionally, in some embodiments, the computing device 500 is connected to or includes a display device 512. As will explained below, these elements (e.g., the hardware processors 502, memory devices 504, network interface devices 506, display interfaces 508, user input adapters 510, display device 512) are hardware devices (for example, electronic circuits or combinations of circuits) that are configured to perform various different functions for the computing device 500.

In some embodiments, each or any of the hardware processors 502 is or includes, for example, a single- or multi-core hardware processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 502 uses an instruction set architecture such as x86 or Advanced RISC Machine (ARM).

In some embodiments, each or any of the memory devices 504 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 502). Memory devices 504 are examples of non-volatile computer-readable storage media.

In some embodiments, each or any of the network interface devices 506 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 508 is or includes one or more circuits that receive data from the hardware processors 502, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 512, which displays the image data. Alternatively or additionally, in some embodiments, each or any of the display interfaces 508 is or includes, for example, a video card, video adapter, or graphics processing unit (GPU).

In some embodiments, each or any of the user input adapters 510 is or includes one or more circuits that receive and process user input data from one or more user input devices (not shown in FIG. 16) that are included in, attached to, or otherwise in communication with the computing device 500, and that output data based on the received input data to the hardware processors 502. Alternatively or additionally, in some embodiments each or any of the user input adapters 510 is or includes, for example, a PS/2 interface, a USB interface, a touchscreen controller, or the like; and/or the user input adapters 510 facilitates input from user input devices (not shown in FIG. 16) such as, for example, a keyboard, mouse, trackpad, touchscreen, etc.

In some embodiments, the display device 512 may be a Liquid Crystal Display (LCD) display, Light Emitting Diode (LED) display, or other type of display device. In embodiments where the display device 512 is a component of the computing device 500 (e.g., the computing device and the display device are included in a unified housing), the display device 512 may be a touchscreen display or non-touchscreen display. In embodiments where the display device 512 is connected to the computing device 500 (e.g., is external to the computing device 500 and communicates with the computing device 500 via a wire and/or via wireless communication technology), the display device 512 is, for example, an external monitor, projector, television, display screen, etc.

In various embodiments, the computing device 500 includes one, or two, or three, four, or more of each or any of the above-mentioned elements (e.g., the hardware processors 502, memory devices 504, network interface devices 506, display interfaces 508, and user input adapters 510). Alternatively or additionally, in some embodiments, the computing device 500 includes one or more of: a processing system that includes the hardware processors 502; a memory or storage system that includes the memory devices 504; and a network interface system that includes the network interface devices 506.

The computing device 500 may be arranged, in various embodiments, in many different ways. As just one example, the computing device 500 may be arranged such that the hardware processors 502 include: a multi (or single)-core hardware processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The hardware processor, the first network interface device, the second network interface device, and the memory devices may be integrated as part of the same SOC (e.g., one integrated circuit chip). As another example, the computing device 500 may be arranged such that: the hardware processors 502 include two, three, four, five, or more multi-core hardware processors; the network interface devices 506 include a first network interface device that implements Ethernet and a second network interface device that implements WiFi and/or Bluetooth; and the memory devices 504 include a RAM and a flash memory or hard disk.

As previously noted, whenever it is described in this document that a software module or software process performs an action, operation, or function, the action, operation, or function is in actuality performed by underlying hardware elements according to the instructions that comprise the software module. Consistent with the foregoing, in various embodiments, each or any combination of the computer system 12, the memory devices 504 could load program instructions for the functionality of the data preprocessor(s) 22, the data filtering 51, prediction processor(s) 24, the clustering, predictive ML models 26, the control system 28, the control ML models 30, the decision making ML models 32, the neural networks 75 and 85, and the monitoring system 34, each of which will be referred to individually for clarity as a "component" for the remainder of this paragraph, are implemented using an example of the computing device 500 of FIG. 16. In such embodiments, the following applies for each component: (a) the elements of the 500 computing device 500 shown in FIG. 16 (i.e., the one or more hardware processors 502, one or more memory devices 504, one or more network interface devices 506, one or more display interfaces 508, and one or more user input adapters 510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 504 (e.g., in various embodiments, in a volatile memory device such as a RAM or an instruction register and/or in a non-volatile memory device such as a flash memory or hard disk) and all actions described herein as performed by the software modules are performed by the processors 502 in conjunction with, as appropriate, the other elements in and/or connected to the computing device 500 (i.e., the network interface devices 506, display interfaces 508, user input adapters 510, and/or display device 512); (c) alternatively or additionally, to the extent it is described herein that the component processes and/or otherwise handles data, in some embodiments, such data is stored in the memory devices 504 (e.g., in some embodiments, in a volatile memory device such as a RAM and/or in a non-volatile memory device such as a flash memory or hard disk) and/or is processed/handled by the processors 502 in conjunction, as appropriate, the other elements in and/or connected to the computing device 500 (i.e., the network interface devices 506, display interfaces 508, user input adapters 510, and/or display device 512); (d) alternatively or additionally, in some embodiments, the memory devices 502 store instructions that, when executed by the processors 502, cause the processors 502 to perform, in conjunction with, as appropriate, the other elements in and/or connected to the computing device 500 (i.e., the memory devices 504, network interface devices 506, display interfaces 508, user input adapters 510, and/or display device 512), each or any combination of actions described herein as performed by the component and/or by any software modules described herein as included within the component.

Consistent with the techniques described herein, as one example, in an embodiment where an instance of the computing device 500 is used to implement the computer system 12, the memory devices 504 could load program instructions for the functionality of the data preprocessor(s) 22, the data filtering 51, prediction processor(s) 24, the clustering, predictive ML models 26, the control system 28, the control ML models 30, the decision making ML models 32, the neural networks 75 and 85, and the monitoring system 34.

The hardware configurations shown in FIG. 16 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 16, (e) via other hardware arrangements, architectures, and configurations, and/or via combinations of the technology described in (a) through (e).

Technical Advantages of Described Subject Matter

The technological improvements offered by the technology described in this application can be applied in different domains, such as for example electronic trading platforms, retail shelf space management, data packet routing over networks, airline fleet scheduling, cargo space optimization for containers optimization, etc. Thus, the technology may be applied to any domain that requires resource allocation.

As explained in the detailed examples described above, the technology may be applied in one or more domains to analyze very large amounts of data for each of many possible, diverse data categories and objects (e.g., including thousands, millions, or even more different possible data sets for each category's data objects) and narrow those large amounts to identify a subset of those data objects that are worth the processing resources required to generate useful data, e.g., that have a high probability of being of significant interest to end users. Less data to be communicated, stored, and processed means less data needs to be communicated over data communication networks by the computer system to end users. It also means there is lower consumption of other computer system resources like memory, storage capacity, and data processing capacity. That results in another benefit—improved performance of the computer system including faster processing speed, faster data communication speed, lower power consumption, and the like.

Using the novel predictive, control, and decision making machine learning models provides another technical advantage of intelligently narrowing large amounts of data to process that is efficient and accurate.

The monitoring and machine learning model retraining provides another technical advantage in that the computer system functions well in and adapts to a rapidly changing environment where data categories, data objects, variable and parameter values, and data set interest all change. The computer system monitors and identifies such changes and adapts the computer system, e.g., by training and retraining the predictive and decision making machine learning models based on feedback that detects those changes, to rapidly and accurately respond and adapt to the changes.

Adjusting (e.g., by retraining) the one or more predictive machine learning models, the one or more control machine learning models, and the one or more decision-making machine learning models based on the performance metrics also allows for a high level of customization through the use of objectives, constraints, and penalties.

Each of the machine learning models (predictive, control, and/or decision making models) has a further technical advantage of being useable in other domains or applications. One example application is using the predictive machine learning model to forecast predetermined performance metrics of each group of data objects to alert significant changes of the data set performance.

Another technical advantage is the computer system 12 is highly compatible with standard product development frameworks (such as Agile).

Another technical advantage is that the computer system 12 is easily maintained because it is highly modularized, e.g., the prediction module, the control module, and the monitoring module. As a result, there is no need to understand the entire computer system 12 or an application of the computer system 12 to maintain and/or enhance part(s) of the system.

Another technical advantage is the computer system 12 is configured to introduce customization in the modeling process. By clustering or segmenting the category datasets, the computer system 12 can train tailored machine learning models capturing segment-specific characteristics and further improve overall performance.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used to provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-16, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system, comprising:
   a transceiver configured to receive over a data communications network different types of input data from multiple source nodes communicating with the data communications network;
   a processing system that includes at least one hardware processor, the processing system configured to:
   (a) define for each of multiple data categories, a set of groups of data objects for the data category based on the different types of input data;
   (b) predict, using one or more predictive machine learning models, a selection score for each group of data objects in the set of groups of data objects for the data category for a predetermined time period;

(c) determine, using one or more control machine learning models, a number for each group of data objects indicating how many data objects are permitted for each group of data objects based on the selection score for each group of data objects;
(d) prioritize, using one or more decision-making machine learning models, the permitted data objects based on one or more predetermined priority criteria;
(e) monitor activities of the computer system for data objects actually selected during the predetermined time period;
(f) calculate performance metrics for each group of data objects predicted to be selected during the predetermined time period based on the data objects actually selected during the predetermined time period; and
(g) adjust the one or more predictive machine learning models, the one or more control machine learning models, and the one or more decision-making machine learning models based on the performance metrics to improve their respective performances.

2. The computer system in claim 1, wherein the processing system is configured to iterate (a)-(g) to improve the respective performances.

3. The computer system in claim 1, wherein the processing system is configured to allocate computer system resources for the prioritized permitted data objects.

4. The computer system in claim 1, wherein the processing system is configured to preprocess the different types of input data to generate (i) category data sets for each category based on one or more parameters associated with the category, (ii) group data sets for each group of data objects based on one or more parameters associated with the group of data objects, and (iii) object data sets for each data object based on one or more parameters associated with the data object.

5. The computer system in claim 4, wherein the processing system is configured to filter each of the category, group, and object data sets to produce corresponding smaller category, group, and object data sets.

6. The computer system in claim 4, wherein the processing system is configured, using the one or more predictive machine learning models, to cluster category data sets into segments, each segment being based on a set of characteristics associated with two or more category data sets.

7. The computer system in claim 6, wherein the processing system is configured to train predictive machine learning models with training data for each cluster segment, and after training, to select one of the predictive machine learning models having a highest model performance.

8. The computer system in claim 7, wherein the processing system is configured to train each of the predictive machine learning models with training data for each cluster segment to determine the selection score for each group of data objects for the predetermined time period.

9. The computer system in claim 1, wherein the processing system is configured to determine, based on the selection score for each group of data objects, the permitted data objects using one or more thresholds and an optimization computer program.

10. The computer system in claim 1, wherein the processing system is configured to prioritize the permitted data objects using heuristic mapping.

11. A method, comprising a computer system that includes at least one memory and at least one hardware processor:
receiving by a transceiver over a data communications network different types of input data from multiple source nodes communicating with the data communications network;
executing, by a processing system that includes at least one processor, instructions stored in memory as follows:
(a) defining for each of multiple data categories, a set of groups of data objects for the data category based on the different types of input data;
(b) predicting, using one or more predictive machine learning models, a selection score for each group of data objects in the set of groups of data objects for the data category for a predetermined time period;
(c) determining, using one or more control machine learning models, a number for each group of data objects indicating how many data objects are permitted for each group of data objects based on the selection score for each group of data objects;
(d) prioritizing, using one or more decision-making machine learning models, the permitted data objects based on one or more predetermined priority criteria;
(e) monitoring activities of the computer system for data objects actually selected during the predetermined time period;
(f) calculating performance metrics for each group of data objects predicted to be selected during the predetermined time period based on the data objects actually selected during the predetermined time period; and
(g) adjusting the one or more predictive machine learning models, the one or more control machine learning models, and the one or more decision-making machine learning models based on the performance metrics to improve their respective performances.

12. The method in claim 11, further comprising iterating (a)-(g) to improve the respective performances.

13. The method in claim 11, further comprising allocating computer system resources for the prioritized permitted data objects.

14. The method in claim 11, further comprising preprocessing the different types of input data to generate (i) category data sets for each category based on one or more parameters associated with the category, (ii) group data sets for each group of data objects based on one or more parameters associated with the group of data objects, and (iii) object data sets for each data object based on one or more parameters associated with the data object.

15. The method in claim 14, further comprising filtering each of the category, group, and object data sets to produce corresponding smaller category, group, and object data sets.

16. The method in claim 14, further comprising using the one or more predictive machine learning models to cluster category data sets into segments, each segment being based on a set of characteristics associated with two or more category data sets.

17. The method in claim 16, further comprising training predictive machine learning models with training data for each cluster segment, and after training, selecting one of the predictive machine learning models having a highest model performance.

18. The method in claim 16, further comprising training each of the predictive machine learning models with training data for each cluster segment to determine the selection score for each group of data objects for the predetermined time period.

19. The method in claim 11, further comprising determining, based on the selection score for each group of data objects, the permitted data objects using one or more thresholds and an optimization computer program.

20. The method in claim 11, further comprising prioritizing the permitted data objects using heuristic mapping.

21. A non-transitory, computer-readable medium encoded with instructions that, when executed by at least one hardware processor in a computer system, cause the at least one hardware processor to receive over a data communications network different types of input data from multiple source nodes communicating with the data communications network and to perform operations comprising:

(a) defining for each of multiple data categories, a set of groups of data objects for the data category based on the different types of input data;

(b) predicting, using one or more predictive machine learning models, a selection score for each group of data objects in the set of groups of data objects for the data category for a predetermined time period;

(c) determining, using one or more control machine learning models, a number for each group of data objects indicating how many data objects are permitted for each group of data objects based on the selection score for each group of data objects;

(d) prioritizing, using one or more decision-making machine learning models, the permitted data objects based on one or more predetermined priority criteria;

(e) monitoring activities of the computer system for data objects actually selected during the predetermined time period;

(f) calculating performance metrics for each group of data objects predicted to be selected during the predetermined time period based on the data objects actually selected during the predetermined time period; and (g) adjusting the one or more predictive machine learning models, the one or more control machine learning models, and the one or more decision-making machine learning models based on the performance metrics to improve their respective performances.

* * * * *